United States Patent
Wang et al.

(10) Patent No.: US 12,408,189 B2
(45) Date of Patent: Sep. 2, 2025

(54) ACTIVE INTERFERENCE CANCELLATION FOR SIDELINK TRANSMISSIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 17/684,908

(22) Filed: Mar. 2, 2022

(65) Prior Publication Data

US 2023/0284253 A1    Sep. 7, 2023

(51) Int. Cl.
*H04W 72/542* (2023.01)
*H04W 72/1263* (2023.01)
*H04W 72/23* (2023.01)
*H04W 92/20* (2009.01)

(52) U.S. Cl.
CPC ..... *H04W 72/542* (2023.01); *H04W 72/1263* (2013.01); *H04W 72/23* (2023.01); *H04W 92/20* (2013.01)

(58) Field of Classification Search
CPC ............... H04W 72/542; H04W 72/23; H04W 72/1263; H04W 92/20
See application file for complete search history.

(56) References Cited

U.S. PATENT DOCUMENTS

2021/0392646 A1* 12/2021 Yang ................... H04W 52/143

* cited by examiner

*Primary Examiner* — Siming Liu
(74) *Attorney, Agent, or Firm* — Holland & Hart LLP

(57) ABSTRACT

Methods, systems, and devices for wireless communications are described. A network entity may transmit one or more control messages including scheduling information for a sidelink transmission and active interference cancellation (AIC) parameters to a transmitting user equipment (UE), a receiving UE, or both. The transmitting UE may relay the AIC parameters to the receiving UE. The transmitting UE may perform the sidelink transmission to a receiving UE. The transmitting UE may perform sidelink AIC on the sidelink transmission according to the AIC parameters. The receiving UE may decode the sidelink transmission by modifying interference at a receiver of the UE.

29 Claims, 18 Drawing Sheets

ACTIVE INTERFERENCE CANCELLATION FOR SIDELINK TRANSMISSIONS

FIELD OF TECHNOLOGY

The following relates to wireless communications, including active interference cancellation (AIC) for sidelink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be otherwise known as user equipment (UE).

SUMMARY

The described techniques relate to improved methods, systems, devices, and apparatuses that support active interference cancellation (AIC) for sidelink transmissions. Generally, the described techniques provide for a user equipment (UE) to perform sidelink AIC for a sidelink transmission to another UE according to one or more AIC parameters from a network entity, such as a base station. For example, the network entity may transmit control messages to one or both UEs including scheduling information for the sidelink transmission and the AIC parameters. In some cases, a UE may relay the sidelink AIC parameters to another UE. A UE may perform the AIC on the sidelink transmission in accordance with the AIC parameters, which may include an AIC optimization area, a time resource for minimized leakage, a frequency resource for minimized leakage, a number of AIC subcarriers, an AIC subcarrier position, an AIC subcarrier pattern, an indication for one or more UEs to perform AIC, a symbol index for sidelink AIC, or a combination thereof. Another UE may decode the sidelink transmission by modifying interference at a receiver of the UE.

A method for wireless communication at a first UE is described. The method may include receiving one or more control messages including scheduling information for a sidelink transmission to a second UE and one or more parameters for sidelink AIC for the sidelink transmission and performing the sidelink transmission to the second UE based on performing the sidelink AIC for the sidelink transmission in accordance with the one or more parameters for the sidelink AIC.

An apparatus for wireless communication at a first UE is described. The apparatus may include a processor, memory coupled with the processor, and instructions stored in the memory. The instructions may be executable by the processor to cause the apparatus to receive one or more control messages including scheduling information for a sidelink transmission to a second UE and one or more parameters for sidelink AIC for the sidelink transmission and perform the sidelink transmission to the second UE based on performing the sidelink AIC for the sidelink transmission in accordance with the one or more parameters for the sidelink AIC.

Another apparatus for wireless communication at a first UE is described. The apparatus may include means for receiving one or more control messages including scheduling information for a sidelink transmission to a second UE and one or more parameters for sidelink AIC for the sidelink transmission and means for performing the sidelink transmission to the second UE based on performing the sidelink AIC for the sidelink transmission in accordance with the one or more parameters for the sidelink AIC.

A non-transitory computer-readable medium storing code for wireless communication at a first UE is described. The code may include instructions executable by a processor to receive one or more control messages including scheduling information for a sidelink transmission to a second UE and one or more parameters for sidelink AIC for the sidelink transmission and perform the sidelink transmission to the second UE based on performing the sidelink AIC for the sidelink transmission in accordance with the one or more parameters for the sidelink AIC.

In some examples of the method, apparatuses, and non-transitory computer-readable medium described herein, receiving the one or more control messages may include operations, features, means, or instructions for receiving a first downlink control information (DCI) message including the scheduling information for the sidelink transmission and receiving a second DCI message including the one or more parameters for the sidelink AIC.

In some examples of the method, apparatuses, and non-transitory computer-readable medium described herein, receiving the one or more control messages may include operations, features, means, or instructions for receiving a single DCI message including the scheduling information for the sidelink transmission and the one or more parameters for the sidelink AIC.

In some examples of the method, apparatuses, and non-transitory computer-readable medium described herein, performing the sidelink AIC for the sidelink transmission may include operations, features, means, or instructions for performing the sidelink AIC using one or more AIC subcarriers associated with one or more time-frequency resources for a sidelink shared channel.

In some examples of the method, apparatuses, and non-transitory computer-readable medium described herein, the one or more time-frequency resources may be associated with a sidelink shared channel.

In some examples of the method, apparatuses, and non-transitory computer-readable medium described herein, a number of the one or more AIC subcarriers may be based on the one or more time-frequency resources including an AIC to automatic gain control (AGC) time-frequency resource.

Some examples of the method, apparatuses, and non-transitory computer-readable medium described herein may further include operations, features, means, or instructions for receiving signaling configuring a set of multiple AIC subcarrier patterns, where the one or more parameters include an AIC subcarrier pattern of the set of multiple AIC subcarrier patterns.

In some examples of the method, apparatuses, and non-transitory computer-readable medium described herein, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

Some examples of the method, apparatuses, and non-transitory computer-readable medium described herein may further include operations, features, means, or instructions for transmitting, to the second UE, the one or more parameters for the sidelink AIC.

Some examples of the method, apparatuses, and non-transitory computer-readable medium described herein may further include operations, features, means, or instructions for transmitting the one or more parameters before performing the sidelink transmission to the second UE.

Some examples of the method, apparatuses, and non-transitory computer-readable medium described herein may further include operations, features, means, or instructions for transmitting the one or more parameters after performing the sidelink transmission to the second UE.

Some examples of the method, apparatuses, and non-transitory computer-readable medium described herein may further include operations, features, means, or instructions for transmitting the one or more parameters in sidelink control information (SCI).

Some examples of the method, apparatuses, and non-transitory computer-readable medium described herein may further include operations, features, means, or instructions for broadcasting the one or more parameters to a set of multiple UEs including the second UE.

Some examples of the method, apparatuses, and non-transitory computer-readable medium described herein may further include operations, features, means, or instructions for receiving the one or more control messages in a group-common channel.

A method for wireless communication at a network entity is described. The method may include determining one or more parameters for sidelink AIC for a sidelink transmission between one or more user equipments (UEs) and transmitting, to the one or more UEs, one or more control messages including scheduling information for the sidelink transmission and the one or more parameters for the sidelink AIC for the sidelink transmission.

An apparatus for wireless communication at a network entity is described. The apparatus may include a processor, memory coupled with the processor, and instructions stored in the memory. The instructions may be executable by the processor to cause the apparatus to determine one or more parameters for sidelink AIC for a sidelink transmission between one or more user equipments (UEs) and transmit, to the one or more UEs, one or more control messages including scheduling information for the sidelink transmission and the one or more parameters for the sidelink AIC for the sidelink transmission.

Another apparatus for wireless communication at a network entity is described. The apparatus may include means for determining one or more parameters for sidelink AIC for a sidelink transmission between one or more user equipments (UEs) and means for transmitting, to the one or more UEs, one or more control messages including scheduling information for the sidelink transmission and the one or more parameters for the sidelink AIC for the sidelink transmission.

A non-transitory computer-readable medium storing code for wireless communication at a network entity is described. The code may include instructions executable by a processor to determine one or more parameters for sidelink AIC for a sidelink transmission between one or more user equipments (UEs) and transmit, to the one or more UEs, one or more control messages including scheduling information for the sidelink transmission and the one or more parameters for the sidelink AIC for the sidelink transmission.

In some examples of the method, apparatuses, and non-transitory computer-readable medium described herein, transmitting the one or more control messages may include operations, features, means, or instructions for transmitting a first DCI message including the scheduling information for the sidelink transmission and transmitting a second DCI message including the one or more parameters for the sidelink AIC.

In some examples of the method, apparatuses, and non-transitory computer-readable medium described herein, transmitting the one or more control messages may include operations, features, means, or instructions for transmitting a single DCI message including the scheduling information for the sidelink transmission and the one or more parameters for the sidelink AIC.

Some examples of the method, apparatuses, and non-transitory computer-readable medium described herein may further include operations, features, means, or instructions for transmitting signaling configuring a set of multiple AIC subcarrier patterns at the one or more UEs, where the one or more parameters include an AIC subcarrier pattern of the set of multiple AIC subcarrier patterns.

In some examples of the method, apparatuses, and non-transitory computer-readable medium described herein, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

Some examples of the method, apparatuses, and non-transitory computer-readable medium described herein may further include operations, features, means, or instructions for transmitting the one or more control messages in a group-common channel.

A method for wireless communication at a first UE is described. The method may include receiving one or more parameters for sidelink AIC for a sidelink transmission, receiving, from a second UE, the sidelink transmission based on modifying interference at a receiver of the first UE according to the one or more parameters, and decoding the sidelink transmission based on modifying the interference at the receiver.

An apparatus for wireless communication at a first UE is described. The apparatus may include a processor, memory coupled with the processor, and instructions stored in the memory. The instructions may be executable by the processor to cause the apparatus to receive one or more parameters for sidelink AIC for a sidelink transmission, receive, from a second UE, the sidelink transmission based on modifying interference at a receiver of the first UE according to the one or more parameters, and decode the sidelink transmission based on modifying the interference at the receiver.

Another apparatus for wireless communication at a first UE is described. The apparatus may include means for receiving one or more parameters for sidelink AIC for a sidelink transmission, means for receiving, from a second UE, the sidelink transmission based on modifying interference at a receiver of the first UE according to the one or more parameters, and means for decoding the sidelink transmission based on modifying the interference at the receiver.

A non-transitory computer-readable medium storing code for wireless communication at a first UE is described. The code may include instructions executable by a processor to receive one or more parameters for sidelink AIC for a sidelink transmission, receive, from a second UE, the sidelink transmission based on modifying interference at a receiver of the first UE according to the one or more parameters, and decode the sidelink transmission based on modifying the interference at the receiver.

In some examples of the method, apparatuses, and non-transitory computer-readable medium described herein, receiving the one or more parameters may include operations, features, means, or instructions for receiving a first DCI message including scheduling information for the sidelink transmission and receiving a second DCI message including the one or more parameters for the sidelink AIC.

In some examples of the method, apparatuses, and non-transitory computer-readable medium described herein, receiving the one or more parameters may include operations, features, means, or instructions for receiving a single DCI message including scheduling information for the sidelink transmission and the one or more parameters for the sidelink AIC.

Some examples of the method, apparatuses, and non-transitory computer-readable medium described herein may further include operations, features, means, or instructions for receiving signaling configuring a set of multiple AIC subcarrier patterns, where the one or more parameters include an AIC subcarrier pattern of the set of multiple AIC subcarrier patterns.

In some examples of the method, apparatuses, and non-transitory computer-readable medium described herein, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

Some examples of the method, apparatuses, and non-transitory computer-readable medium described herein may further include operations, features, means, or instructions for receiving the one or more parameters before receiving the sidelink transmission from the second UE.

Some examples of the method, apparatuses, and non-transitory computer-readable medium described herein may further include operations, features, means, or instructions for receiving the one or more parameters after receiving the sidelink transmission from the second UE.

Some examples of the method, apparatuses, and non-transitory computer-readable medium described herein may further include operations, features, means, or instructions for receiving the one or more parameters in SCI.

Some examples of the method, apparatuses, and non-transitory computer-readable medium described herein may further include operations, features, means, or instructions for receiving the one or more parameters for the sidelink AIC from the second UE, a network entity, or both.

DETAILED DESCRIPTION

In some wireless communications systems, one or more wireless devices may communicate according to a waveform, such as an orthogonal frequency division multiplexing (OFDM) waveform, a direct Fourier transform-spread OFDM (DFT-s-OFDM) waveform, or the like. For example, a user equipment (UE) may support an OFDM waveform for downlink communications from a network entity, such as a base station, sidelink communication with another UE, or both. An OFDM waveform may use modulation techniques to transmit signals over carriers (e.g., frequency ranges) during a transmission frequency window. The waveform may have a relatively high sidelobe in the frequency domain outside of the transmission frequency window. The frequency sidelobe may cause interference at other wireless devices. In some cases, for sidelink transmission (e.g., between two UEs), a UE may be moving at a relatively high velocity, causing synchronization errors between the UE and another synchronized UE. The synchronization error may result in interference due to frequency sidelobes of transmissions.

In some examples, a wireless device may use active interference cancellation (AIC) to improve waveform properties, such that a transmitter and receiver may efficiently decode a signal. A network entity may transmit signaling to one or more UEs including scheduling information for a sidelink transmission and one or more parameters for applying AIC to the sidelink transmission. For example, the network entity may transmit a single downlink control information (DCI) message including the scheduling information and parameters or separate DCI messages including the scheduling information and parameters. The network entity may transmit the signaling to a transmitting UE, a receiving UE, or both. The transmitting UE may relay the parameters to the receiving UE. The transmitting UE may perform a sidelink transmission with the AIC applied according to the parameters. The receiving UE may modify interference at a receiver based on the AIC parameters to decode the sidelink transmission.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to AIC for sidelink transmissions.

Figure 1:
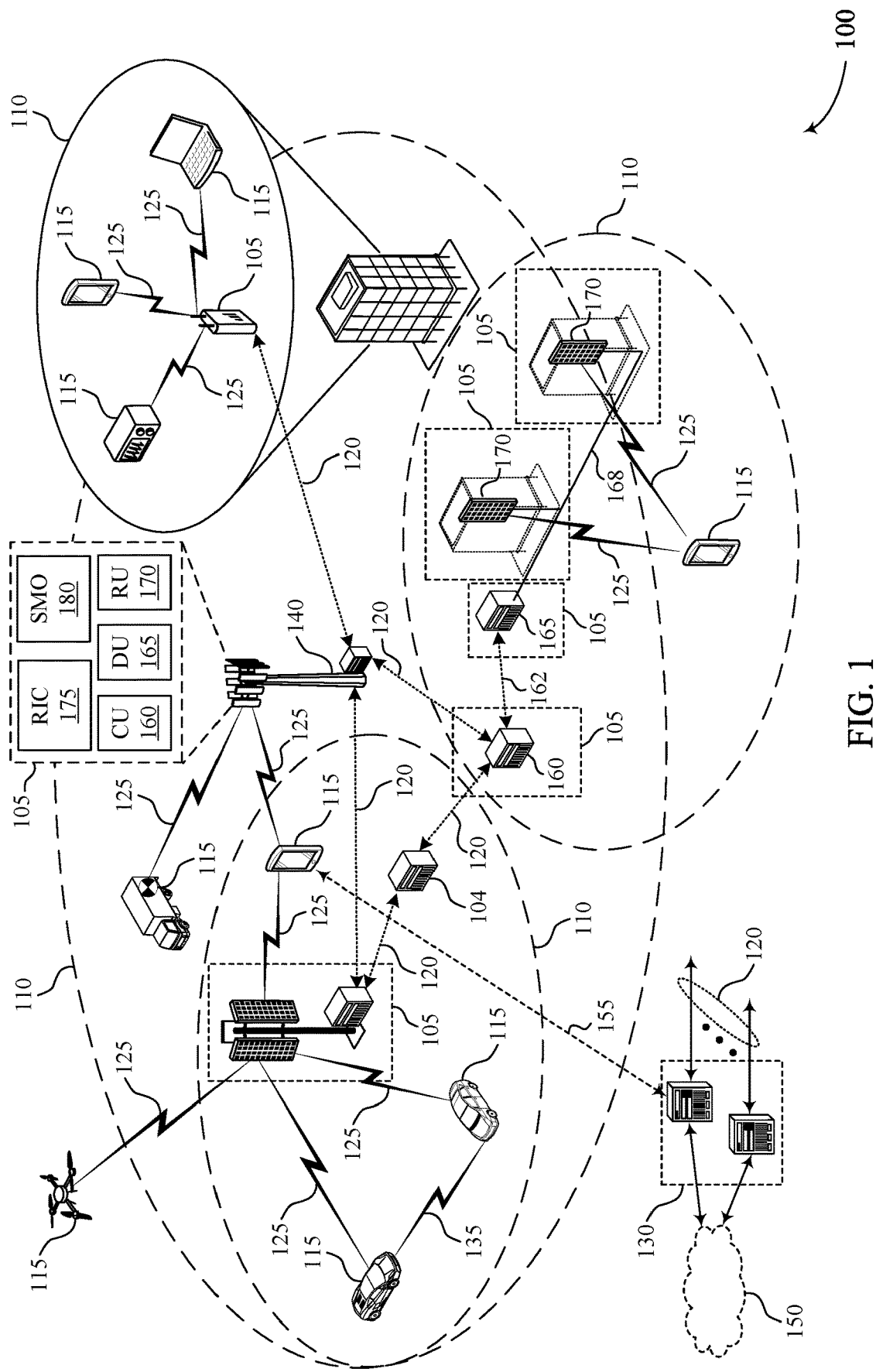
FIGS. 1 and 2 illustrate examples of wireless communications systems that support active interference cancellation (AIC) for sidelink transmissions in accordance with aspects of the present disclosure.

FIG. 1 illustrates an example of a wireless communications system 100 that supports AIC for sidelink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the network node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, a network entity 105, apparatus, device, computing system, or the like may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., as a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support active interference cancellation for sidelink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 (e.g., an access link) may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. Also, as used herein, the phrase "a set" shall be construed as including the possibility of a set with one member. That is, the phrase "a set" shall be construed in the same manner as "one or more." The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a device receives and the higher the order of the modulation scheme, the higher the data rate may be for the device. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105 (e.g., a base station 140, an RU 170), which may support aspects of such D2D communications being configured or scheduled by the network entity 105. In some examples, one or more UEs 115 in such a group may be outside the geographic coverage area 110 of a network entity 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In some other examples, D2D communications are carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105 (e.g., a base station 140, an RU 170), a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. A RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other cases, the device may provide HARQ feedback in a subsequent slot, or according to some other time interval.

In some examples, one or more UEs 115 may communicate data or control signaling with one or more other UEs 115, which may be referred to as sidelink communications. For example, the UEs 115 may be vehicles in a V2X system. The vehicles may be capable of cellular communications, thus may cellular-V2X (C-V2X) capable. In some examples, to receive a sidelink transmission (e.g., a sidelink packet), a receiving UE 115 may perform blind decoding in one or more sidelink sub-channels. The number of sub-channels may be relatively small (e.g., 1-27 sub-channels), such that the receiving UE 115 may feasibly blind decode each sub-channel. The size of a sub-channel in wireless communication system 100 may be relatively large. For example, a sub-channel for a V2X system may be 10 resource blocks (RBs) or more.

In some cases, a UE 115 may transmit a sidelink control channel (e.g., a physical sidelink control channel (PSCCH)) and a sidelink shared channel (e.g., a physical sidelink shared channel (PSSCH)) within a same time resource, such as a slot. A slot may be a duration used as a dynamic scheduling unit for uplink and downlink transmissions. The sidelink shared channel may occupy up to $N_{sub-channel}^{Sidelink}$ contiguous sub-channels, where $N_{sub-channel}^{Sidelink}$ the number of sidelink sub-channels. The sidelink control channel may occupy up to one sub-channel, such as a sub-channel with a lowest sub-channel index. The UE may transmit sidelink control information (SCI) to another UE in the sidelink control channel. For example, the UE 115 may transmit different types of SCI, such as stage one and stage two SCI. The UE 115 may transmit stage one SCI in a sidelink control channel including information about a sidelink shared channel bandwidth and resource reservations in future slots. The UE 115 may transmit stage two SCI to a UE 115 after the UE 115 decodes a sidelink control channel. The stage two SCI may include a source identifier (ID) and destination ID, which the UE 115 may use to distinguish whether a packet is for the UE 115 and from which UE 115 the packet is coming from.

In some examples, the stage one SCI in the sidelink control channel may include a frequency domain resource allocation (FDRA), a time domain resource allocation (TDRA), or both. A FDRA may allocate frequency resources for one or more resource reservations. For example, a UE may allocate $$\left\lceil \log \frac{N_{subchannel}^{SL}(N_{subchannel}^{SL}+1)}{2} \right\rceil$$

bits for two reservations or $$\left\lceil \log \frac{N_{subchannel}^{SL}(N_{subchannel}^{SL}+1)(2N_{subchannel}^{SL}+1)}{6} \right\rceil$$

bits for three reservations. Similarly, a TDRA may allocate time resources for one or more resource reservations. For example, a UE may allocate 5 bits for two reservations or 9 bits for three reservations.

A network entity 105 or UE 115 may configure a sidelink control channel to occupy a number of physical resource blocks (PRBs) (e.g., {10, 12, 15, 20, 25} PRBs) per sub-channel. Similarly, the network entity 105 or the UE 115 may configure the sidelink control channel duration for a number of symbols (e.g., two or three symbols), where a slot may be divided into multiple symbols. The network entity 105 or UE 115 may define a number of sub-channels for a resource pool (RP). For example, there may be 1-27 sub-channels for a RP. The size of the sidelink control channel may be fixed for the RP. For example, the size of the sidelink control channel may be 10% to 100% of a sub-channel (e.g., first two or three symbols) depending on the sidelink control channel duration configuration. A sidelink shared channel may occupy at least one sub-channel and may include stage two SCI.

In some examples, in a V2X system, a network entity 105 may assign transmission resources for sidelink communications via a DCI message (e.g., DCI format 3_0 message). Additionally or alternatively, a transmitting UE 115 may autonomously determine one or more time-frequency resources for sidelink communications. If the network entity 105 assigns the transmission resources, the network entity 105 may activate a configured grant (CG), dynamic grant (DG), or the like. For example, the network entity 105 may transmit RRC signaling to a UE 115 activating a CG (e.g., type 1 CG). The DCI message may allocate time and frequency resources and may indicate transmission timing. The UE 115 may determine a modulation and coding scheme (MCS) within a threshold set by the network entity 105. If the UE 115 autonomously determines the time-frequency resources, the transmitting UE 115 may perform channel sensing by blindly decoding sidelink control channels and discovering reserved resources (e.g., resources reserved for other sidelink transmissions). The transmitting UE 115 may report available resources to a network entity 105 using higher layer signaling. The network entity 105 may determine the resource usage for the transmitting UE 115 accordingly.

In some examples, for Industrial IoT (IIoT) systems, sidelink communications may enable communications between a direct programmable logical controller (PLC) and one or more sensors/actuators (SAs). The PLC may be wireless for flexible and simple deployment. In some cases, the PLC may control multiple SAs, such as 20-50 SAs. The PLC may operate under ultra-reliable conditions, with a tight latency (e.g., 1 to 2 milliseconds (ms) and $10^{-6}$ error rate). Communication between a PLC and a network entity 105 may use multiple over-the-air (OTA) interfaces, which may increase latency and reduce reliability. In some examples, IIoT traffic may be deterministic and may have a relatively small packet size (e.g., 32-256 bytes). Thus, the IIoT traffic may use relatively low bandwidth, which may mean fewer RB usage (e.g., 2 RBs may be sufficient for communications). In some cases, a SA may have reduced UE capability in terms of bandwidth and processing power when compared with other UEs 115. The SA may detect or monitor a reduced number of transmissions. An overall bandwidth may be relatively large for an IIoT system with dedicated frequency bands, unlicensed bands, or both. Thus, a sidelink control channel may meet IIoT resource and communication conditions (e.g., challenging radio frequency environments with blockage and interference).

In some examples, a UE 115 may transmit a type 1 or stage 1 SCI in a sidelink control channel. The SCI transmission may include multiple bits of information. For example, the SCI may include three bits for priority information, a frequency resource assignment with a number of bits depending on a number of slot reservations and number of sub-channels, five or nine bits for two or three reservations, respectively, for a time resource assignments, a resource reservation period with a number of bits depending on a number of allowed periods, a demodulation reference signal (DMRS) pattern with a number of bits depending on a number of configured patterns, two bits of a stage 2 SCI format, two bits of a beta offset for the stage 2 SCI rate matching, one bit indicating one or two data layers for a DMRS port, five bits for the MCS, zero to two bits for an additional MCS table, zero or one bit for a sidelink feedback channel overhead indicator, a number of reserved bits up to an upper layer, or a combination thereof. A receiving UE 115 may decode the SCI and other sidelink UEs 115 (e.g., in the area) may perform channel sensing to avoid resource collision.

In some cases, a UE 115 may transmit a type 2 or stage 2 SCI in a sidelink shared channel. The stage 2 SCI may be front-loaded in the sidelink shared channel. Similar to the stage 1 SCI, the stage 2 SCI may include multiple bits of information. For example, the stage 2 SCI may include a HARQ ID with a number of bits depending on a HARQ process, one bit for a new data indicator (NDI), two bits for a redundancy version (RV) ID, eight bits for a source ID, 16 bits for a destination ID, one bit to indicate whether HARQ is enabled or disabled, two bits for a cast type (e.g., broadcast, groupcast, unicast, or the like), one bit for a channel state information (CSI) request, 12 bits for a zone ID, four bits for a communication range indication, or a combination thereof. A receiving UE 115 may use the stage 2 SCI to decode a sidelink shared channel.

In some examples, one or more UEs 115 may be synchronized to different sources. Additionally or alternatively, a UE 115 may be moving at a relatively high velocity. Thus, a relative synchronization error between UEs 115 may be relatively large. Poorly synchronized UEs 115 may cause interference to transmissions between well-synchronized UEs 115 (e.g., uplink UEs 115), since transmissions may be adjacent, which is described in further detail with respect to FIG. 3. The interference may result from sidebands or sidelobes for the sidelink transmission. Thus, a UE 115 may apply AIC to one or more sidelink transmissions according to information received in control signaling from a network entity 105. The AIC may reduce sidelink-to-sidelink interference, may suppress sidelink-to-uplink interference, or both.

Figure 2:
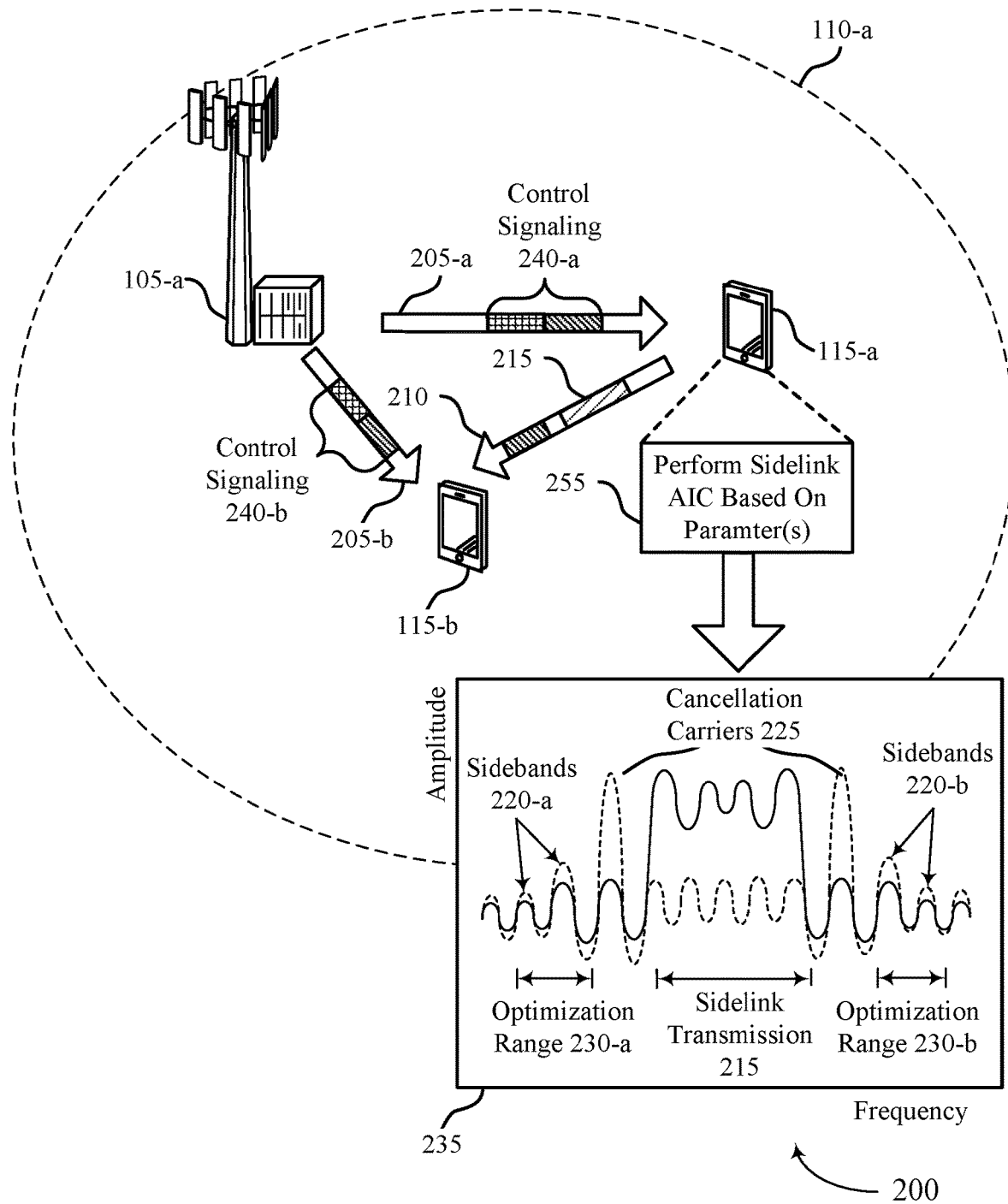

FIG. 2 illustrates an example of a wireless communications system 200 that supports AIC for sidelink transmissions in accordance with aspects of the present disclosure. In some examples, wireless communications system 200 may implement aspects of wireless communications system 100 and may include a UE 115-*a*, a UE 115-*b*, and a network entity 105-*a* with a coverage area 110-*a*, which may be examples of UEs 115 and a network entity 105 with a coverage area 110 as described with reference to FIG. 1. In some examples, the network entity 105-*a* and the UEs 115 may communicate control information, data, or both using a downlink communication link 205-*a* or a downlink communication link 205-*b*. For example, the network entity 105-*a* may communicate with the UE 115-*a* via a downlink communication link 205-*a*, while the network entity 105-*a* may communicate with the UE 115-*b* via a downlink communication link 205-*b*.

Similarly, the UEs 115 may communicate control information, data, or both with each other using a sidelink communication link 210. For example, UE 115-*a* may transmit a sidelink transmission 215 to UE 115-*b* via the sidelink communication link 210. Wireless devices in wireless communications system 200, such as the network entity 105-*a*, the UE 115-*a*, and the UE 115-*b* may communicate the control information, data, or both according to a waveform (e.g., defining a frequency and amplitude of signaling).

For example, the wireless devices may communicate according to an OFDM waveform in which multiple carriers (e.g., component carriers) may be closely spaced. In some examples, wireless devices may use the OFDM waveform for uplink, downlink, and sidelink communications. Additionally or alternatively, the wireless devices may use a waveform other than an OFDM waveform, such as a DFT-s-OFDM waveform for an improved peak-to-average power ratio (PAPR) in uplink transmissions.

When a wireless device modulates signaling over the carriers, sidebands 220-a and sidebands 220-b may spread from either side of the signaling. In some examples, sidebands 220-a and sidebands 220-b may also be referred to as sidelobes. For example, the UE 115-a may transmit the sidelink transmission 215 to the UE 115-b according to an OFDM waveform, which may generate sidebands 220-a and sidebands 220-b on either side of the sidelink transmission 215. The OFDM waveform may exhibit relatively high sidebands 220-a and sidebands 220-b in a frequency domain (e.g., due to the sinc spectrum in the frequency domain). The sidebands 220-a and sidebands 220-b may cause interference at other wireless devices if one or more sidelink transmissions 215 between UEs 115 or subcarriers are not synchronized in the time or frequency domain.

Thus, a wireless device may perform AIC to cancel out sidebands 220-a and sidebands 220-b. For example, UE 115-a may use one or more cancellation subcarriers 225 within a frequency range to cancel one or more sidebands 220-a and sidebands 220-b. UE 115-a may cancel the sidebands 220-a within the optimization range 230-a and the sidebands 220-b within the optimization range 230-b using the cancellation subcarriers 225. The cancellation subcarriers 225 may be introduced with a variable power and spacing, such that by carefully selecting the positions of the cancellation subcarriers 225 and symbols modulated on the cancellation subcarriers 225, the UE 115-a may suppress OFDM sidebands 220-a and OFDM sideband 220-b significantly or altogether. For example, as shown in the frequency diagram 235 in wireless communications system 200, two cancellation subcarriers 225 may be used at the boundary of a frequency allocation for UE 115-a, and the sidebands 220-a and the sidebands 220-b may be suppressed (e.g., by more than 30 decibels (dB)).

In some examples, one or more UEs 115 may be synchronized to different sources. For example, a UE 115 may be synchronized to a global navigation satellite system (GNSS), a network entity 105, or another UE 115. If the UE 115 is a vehicle in a C-V2X system, the UE 115 may be moving at a relatively high velocity. Thus, a relative synchronization error between UEs 115 may be relatively large. Poorly synchronized UEs 115 may cause interference to transmissions between well-synchronized UEs 115 (e.g., uplink UEs 115) since transmissions may be adjacent, which is described in further detail with respect to FIG. 3. For example, the sidelink transmission 215 between UE 115-a and UE 115-b may cause interference to an uplink transmission from UE 115-b to network entity 105-a. The interference may result from the sideband 220-a and the sideband 220-b for the sidelink transmission 215.

Thus, UE 115-a may apply AIC to one or more sidelink transmissions 215 according to information received in control signaling 240 from network entity 105-a. The AIC may reduce sidelink-to-sidelink interference, may suppress sidelink-to-uplink interference (e.g., for URLLC uplink traffic), or both. In some examples, the network entity 105-a may transmit control signaling 240 to the UE 115-a, the UE 115-b, or both. For example, the network entity 105-a may transmit the control signaling 240-a to the UE 115-a and the control signaling 240-b to the UE 115-b. The control signaling 240 may include scheduling information 245 for a sidelink transmission 215 between UE 115-a and UE 115-b. The control signaling 240 may also include one or more parameters for sidelink AIC for the sidelink transmission 215, which may be referred to as sidelink AIC parameters 250. In some cases, network entity 105-a may send the scheduling information 245 and the sidelink AIC parameters 250 to UE 115-a, and UE 115-a may relay the sidelink AIC parameters 250 to UE 115-b, which is described in further detail with respect to FIG. 4A and FIG. 4B.

At 255, the UE 115-a may send the sidelink transmission 215 to the UE 115-b based on performing sidelink AIC for the sidelink transmission 215 using the sidelink AIC parameters 250. That is, UE 115-a may use the cancellation subcarriers 225 within one or more optimization range 230-a and optimization range 230-b to reduce interference from the sidebands 220-a and sideband 220-b. The sidelink AIC parameters 250 may include an AIC optimization range 230-a and optimization range 230-b, a time resource for a minimized leakage, a frequency resource for a minimized leakage, a number of AIC subcarriers (e.g., cancellation subcarriers 225), an AIC subcarrier position, an AIC subcarrier pattern, an indication of one or more UEs 115 to perform the sidelink AIC (e.g., immediately adjacent UEs 115 to the optimization range 230-a or optimization range 230-b or area), a symbol index within which to perform the sidelink AIC, or any combination thereof. In some examples, the control signaling 240 may be conveyed in a group common-PDCCH (GC-PDCCH) to both uplink and sidelink UEs 115. Additionally or alternatively, the control signaling 240 may be conveyed in DCI scheduling the sidelink transmission 215.

In some examples, for sidelink communications over a data channel, AIC subcarriers, or the cancellation subcarriers 225, may use resources for a sidelink shared channel excluding stage 2 SCI resources. For sidelink communications over a sidelink shared channel (e.g., a PSSCH), the AIC subcarriers may not use resources allocated to the sidelink shared channel. For sidelink communication over any resource allocation, the AIC subcarriers may use any resources. In some cases, for an automatic gain control (AGC) symbol, a UE 115 may use more AIC subcarriers. In some examples, the UE 115 may not perform AIC for a sidelink feedback channel (e.g., a physical sidelink feedback channel (PSFCH))

In some examples, UE 115-a may apply the AIC according to the control signaling from the network entity 105-a (e.g., in one or more AIC optimization ranges 230-a or optimization range 230-b, or areas). The UE 115-a may inform the UE 115-b about the sidelink AIC parameters 250, such as a number of subcarriers, AIC subcarrier positions (e.g., boundaries of the frequency allocation, or subcarriers with smallest or largest indexes), OFDM symbol indexes with AIC (e.g., each symbol for a PSSCH without SCI), a pre-configured number of patterns (AIC off, AIC On with two AIC subcarriers at frequency allocation boundaries, AIC ON with two AIC subcarrier with a largest frequency subcarrier index, etc.), or a combination thereof. In some cases, UE 115-a may transmit the sidelink AIC parameters 250 to UE 115-b in SCI (e.g., stage 2 SCI) via sidelink communication link 210. UE 115-a may send the indication of the sidelink AIC parameters 250 to UE 115-b after the sidelink transmission 215 with the AIC via SCI, a MAC-control element (MAC-CE), RRC signaling, or the like (e.g., post-indication to indicate AIC operation of a previous sidelink transmission 215).

In some cases, the UE 115-a may inform sidelink UEs 115 in a coverage area 110 of the UE 115-a about an AIC protection area. For example, UE 115-a may broadcast (e.g., in SCI) the AIC optimization range 230-a or optimization range 230-b where leakage may be minimized to other surrounding sidelink UEs 115. The other sidelink UEs 115 may decode the information and may apply AIC to minimize the leakage area accordingly.

Figure 3:
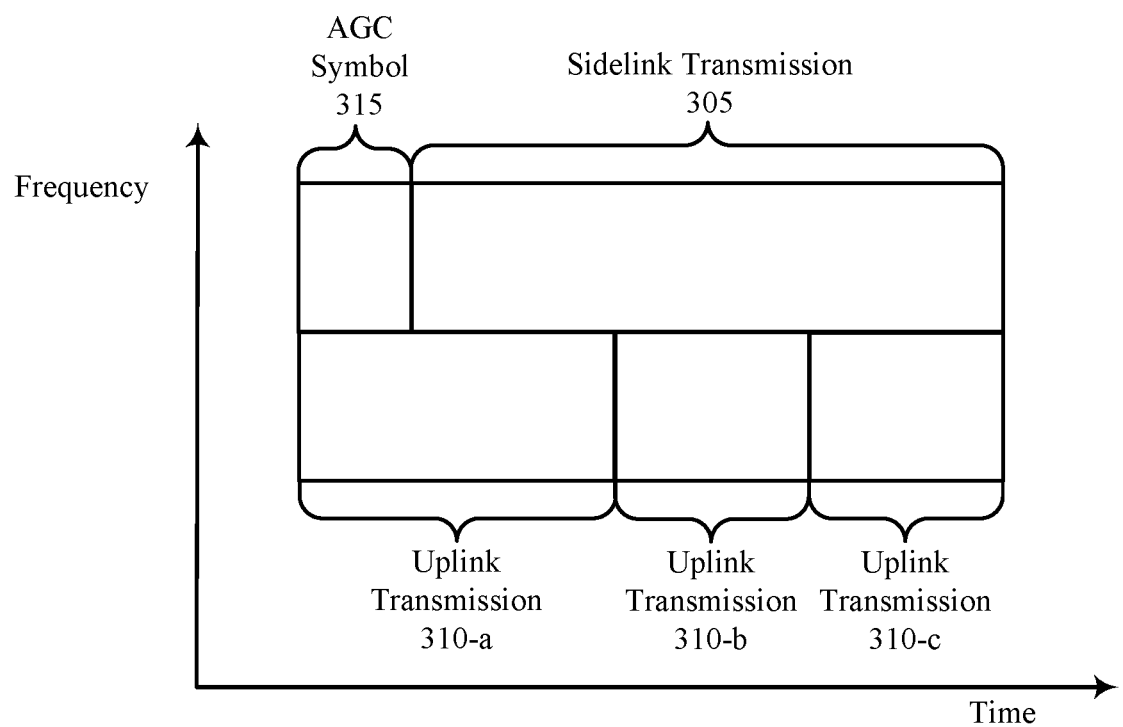
FIG. 3 illustrates an example of a resource diagram that supports AIC for sidelink transmissions in accordance with aspects of the present disclosure.

FIG. 3 illustrates an example of a resource diagram 300 that supports AIC for sidelink transmissions in accordance with aspects of the present disclosure. In some examples, resource diagram 300 may implement aspects of wireless communications system 100 and wireless communications system 200. For example, as illustrated in resource diagram 300, a UE 115 may transmit a sidelink transmission 305 next to one or more of: an uplink transmissions 310-a, an uplink transmission 310-b, and an uplink transmission 310-c using AIC to avoid causing interference at the uplink transmission 310-a, the uplink transmission 310-b, and the uplink transmission 310-c.

In some examples, a UE 115 may transmit a sidelink transmission 305 to another UE 115. The sidelink transmission 305 may span one or more symbols (e.g., OFDM symbols) in a slot. The slot may include the sidelink transmission 305 and an AGC symbol 315, which may be used to measure a signal strength and perform AGC prior to receiving the sidelink transmission 305 to maintain a constant output signal level after amplification. Similarly, one or more UEs 115 (e.g., including the sidelink UE 115, or not) may transmit the uplink transmission 310-a, the uplink transmission 310-b, and the uplink transmission 310-c to a network entity 105 at the same time and using adjacent frequencies. For example, a UE 115 may transmit the uplink transmission 310-a, the same or a different UE 115 may transmit the uplink transmission 310-b, and a same or different UE may transmit the uplink transmission 310-c. The uplink transmission 310-a may be transmitted during the same symbols as the AGC symbol 315 and part of the sidelink transmission 305, while the uplink transmission 310-b and the uplink transmission 310-c may be transmitted during the same symbols as the sidelink transmission 305. A UE 115 may transmit the AGC symbol 315 and the sidelink transmission 305 using an adjacent frequency band to the uplink transmission 310-a, the uplink transmission 310-b, and the uplink transmission 310-c.

In some examples, a relative synchronization error between UEs 115 for the sidelink transmission 305 may be relatively large (e.g., due to motion at the UEs 115). The sidelink transmission 305 between poorly synchronized UEs 115 may cause interference to the uplink transmission 310-a, the uplink transmission 310-b, and the uplink transmission 310-c (e.g., even if the UEs 115 transmitting the uplink transmission 310-a, the uplink transmission 310-b, and the uplink transmission 310-c are well-synchronized). For example, because the sidelink transmission 305 shares adjacent frequency resources with the uplink transmission 310-a, the uplink transmission 310-b, and the uplink transmission 310-c, any variation in frequency outside the allotted frequency resources for the sidelink transmission 305 may cause interference for the uplink transmission 310-a, the uplink transmission 310-b, and the uplink transmission 310-c. For example, the sidelink transmission 305 between two UEs 115 may cause interference to the uplink transmission 310-a, the uplink transmission 310-b, and the uplink transmission 310-c from UE 115-b to network entity 105-a. The interference may result from the sidebands for the sidelink transmission 305.

Thus, a UE 115 sending the sidelink transmission 305 may apply AIC to the sidelink transmission 305 and the AGC symbol 315 according to information received from a network entity 105. The AIC may reduce the sidelink-to-sidelink interference, may suppress the sidelink-to-uplink interference (e.g., for URLLC uplink traffic), or both. For example, the sidelink transmission 305 with AIC may not interfere with the uplink transmission 310-a, the uplink transmission 310-b, and the uplink transmission 310-c.

Figure 4A:
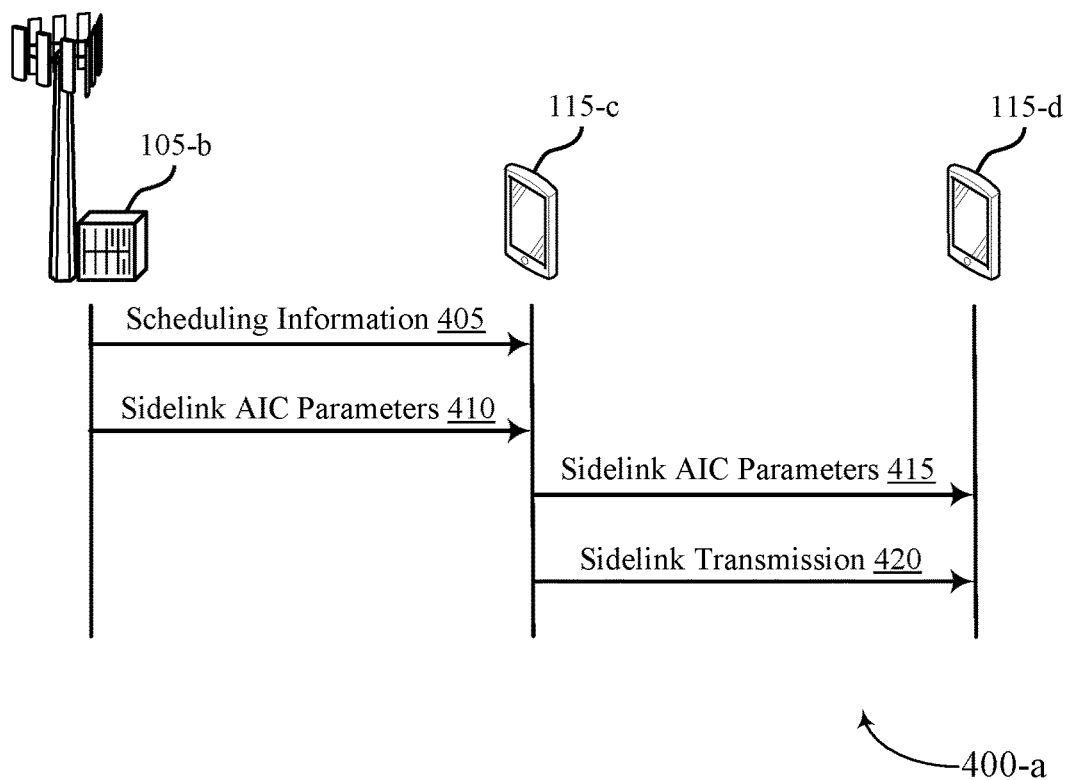
FIGS. 4A, 4B, and 5 illustrate examples of process flows that support AIC for sidelink transmissions in accordance with aspects of the present disclosure.
Figure 4B:
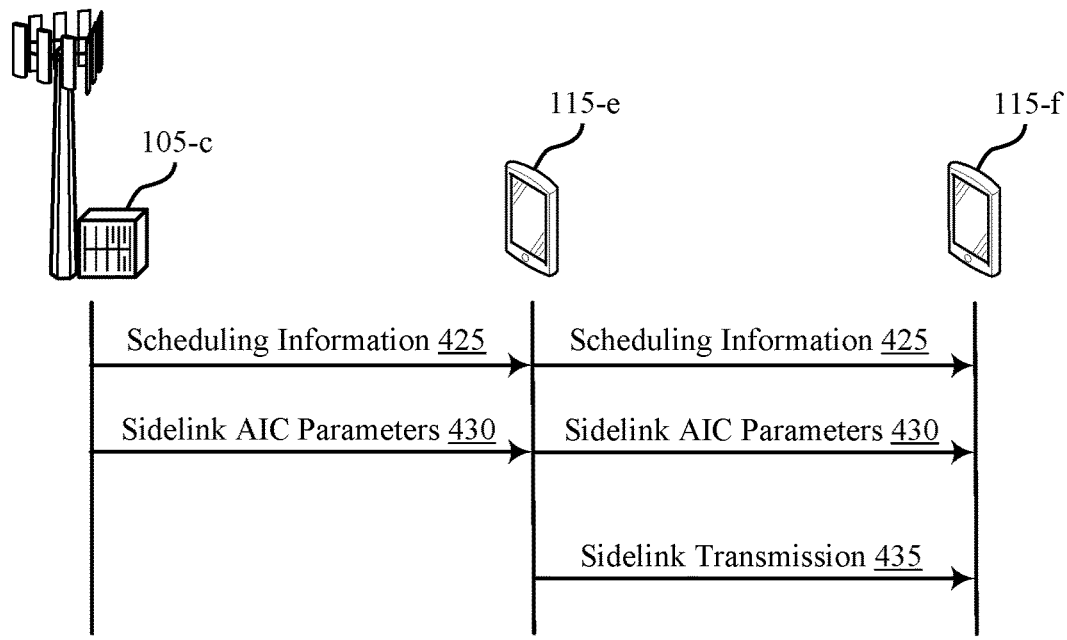

FIGS. 4A and 4B illustrate an example of process flow 400-a and process flow 400-b that support AIC for sidelink transmissions in accordance with aspects of the present disclosure. In some examples, the process flow 400-a and the process flow 400-b may implement aspects of wireless communications system 100, wireless communications system 200, and resource diagram 300. The process flow 400-a may illustrate an example of a UE 115-c receiving scheduling information and sidelink AIC parameters from a network entity 105-b, and forwarding the AIC parameters to another UE 115-d for a sidelink transmission. Similarly, process flow 400-b may illustrate an example of a UE 115-e and a UE 115-f receiving the scheduling information and the sidelink AIC parameters from a network entity 105-c, and communicating a sidelink transmission accordingly. The network entity 105-b, the network entity 105-c, and the UE 115-d through the UE 115-f may be examples of network entities 105 and UEs 115 as described with reference to FIGS. 1 and 2. Alternative examples of the following may be implemented, where some processes are performed in a different order than described or are not performed. In some cases, processes may include additional features not mentioned below, or further processes may be added.

In some examples, as illustrated in process flow 400-a, At 405 and 410, network entity 105-b may transmit scheduling information for a sidelink transmission to the UE 115-c and one or more sidelink AIC parameters for performing AIC on the sidelink transmission. The one or more sidelink AIC parameters may instruct the UE 115-c to perform AIC to reduce sidelink leakage to uplink or other sidelink transmissions. The network entity 105-b may transmit the scheduling information and the sidelink AIC parameters to the UE 115-c in DCI (e.g., DCI format 3_0). For example, the network entity 105-b may transmit the sidelink information in a same or separate DCI message as the sidelink AIC parameters.

At 415, UE 115-c may relay the sidelink AIC parameters to UE 115-d. For example, UE 115-c may send the sidelink AIC parameters to UE 115-d in SCI. At 420, UE 115-c may modify the sidelink transmission to include AIC operation and may send the sidelink transmission to UE 115-d. UE 115-c may broadcast the sidelink AIC parameters (e.g., an AIC protection area) to surrounding UEs 115, including UE 115-d. UE 115-d may decode the sidelink transmission using the sidelink AIC parameters.

In some other examples, as illustrated in process flow 400-b, at 425 and 430, a network entity 105-c may transmit scheduling information and sidelink AIC parameters to multiple UEs 115, including UE 115-e and UE 115-f. For example, the network entity 105-c may broadcast the scheduling information and the sidelink AIC parameters in a group common control channel (e.g., GC-PDCCH). The UE 115-e may not transmit the sidelink AIC parameters to the UE 115-f as the network entity 105-c may have already sent them to the UE 115-f. As discussed at 420 with reference to process flow 400-a, at 435, the UE 115-e may send the sidelink transmission to UE 115-f by performing AIC to the sidelink transmission.

Figure 5:
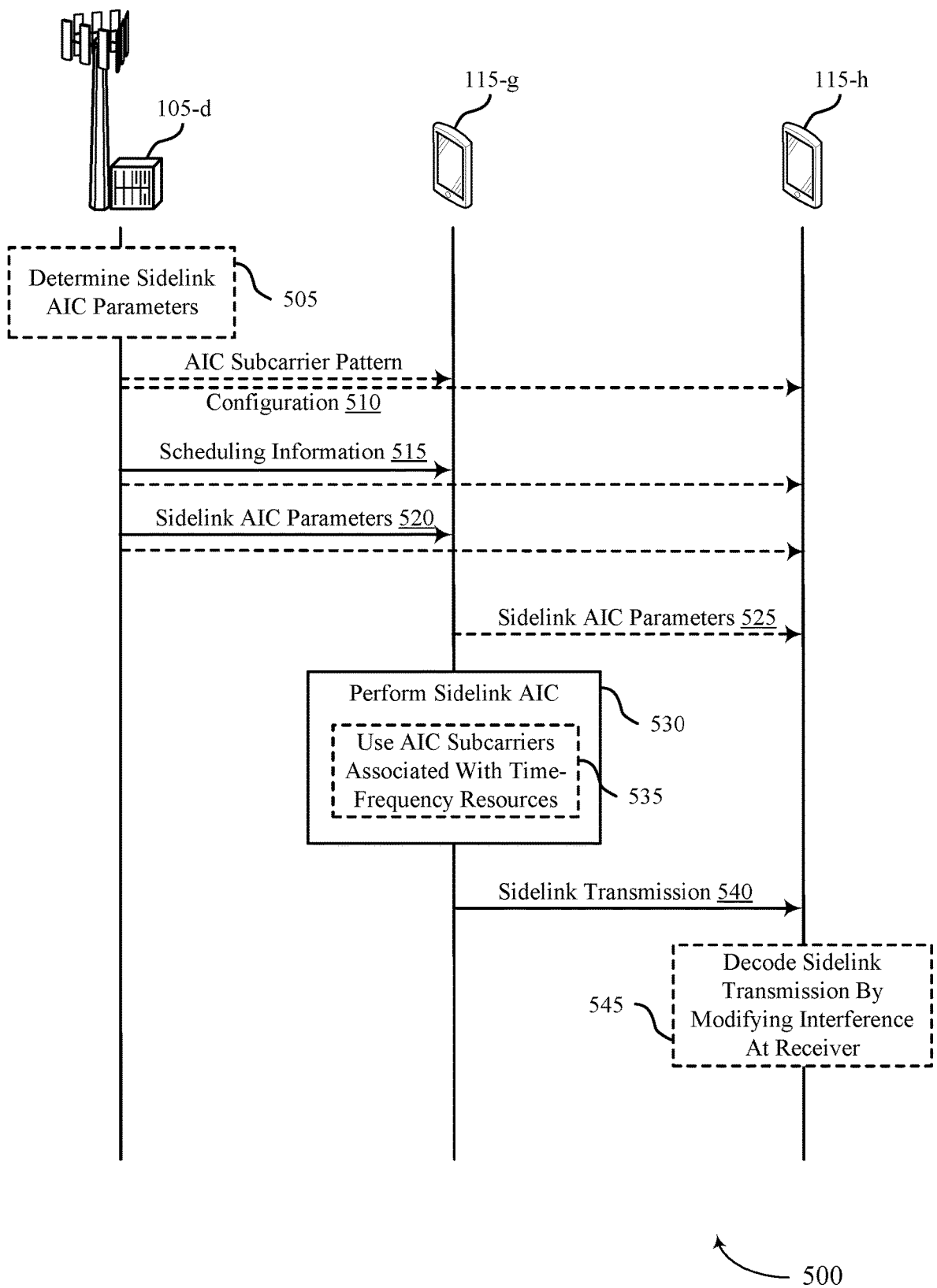

FIG. 5 illustrates an example of a process flow 500 that supports AIC for sidelink transmissions in accordance with aspects of the present disclosure. In some examples, the process flow 500 may implement aspects of wireless communications system 100, wireless communications system 200, resource diagram 300, process flow 400-a, and process flow 400-b. The process flow 500 may illustrate an example of a UE 115-g performing sidelink AIC for a sidelink transmission to a UE 115-h according to sidelink AIC parameters received from a network entity 105-d. The network entity 105-d, the UE 115-g, and the UE 115-h may be examples of a network entity 105 and UEs 115 as described with reference to FIGS. 1 and 2. Alternative examples of the following may be implemented, where some processes are performed in a different order than described or are not performed. In some cases, processes may include additional features not mentioned below, or further processes may be added.

At 505, the network entity 105-d may determine one or more sidelink AIC parameters for sidelink communications between one or more UEs 115 (e.g., UE 115-g and UE 115-h). In some cases, the one or more sidelink AIC parameters include an AIC optimization area, a time resource for a minimized leakage, a frequency resource for the minimized leakage, a number of AIC subcarriers (e.g., cancellation carriers), an AIC subcarrier position, an AIC subcarrier pattern, an indication of one or more UEs 115 to perform the sidelink AIC, a symbol index associated with the sidelink AIC, or any combination thereof.

At 510, the network entity 105-d may transmit an AIC subcarrier pattern configuration to UE 115-g, UE 115-h, or both. The AIC subcarrier pattern configuration may indicate one or more defined AIC subcarrier patterns, or cancellation carrier patterns. In some examples, the AIC subcarrier patterns may include AIC off, AIC On with two AIC subcarriers at frequency allocation boundaries, AIC ON with two AIC subcarrier with a largest frequency subcarrier index, and the like. In some cases, the determined sidelink AIC parameters may include an indication of an AIC subcarrier pattern of the defined subcarrier patterns.

At 515, the network entity 105-d may transmit a control message including scheduling information for a sidelink transmission between the UE 115-g and the UE 115-h. In some cases, the network entity 105-d may transmit the scheduling information to the UE 115-g directly, or to both the UE 115-g and the UE 115-h in a broadcast signal.

Similarly, at 520, the network entity 105-d may transmit the sidelink AIC parameters to the UE 115-g, the UE 115-h, or both. For example, the network entity 105-d may transmit the sidelink AIC parameters to the UE 115-g only, or may broadcast the sidelink AIC parameters to the UE 115-g and the UE 115-h. If the network entity 105-d broadcasts the scheduling information or the sidelink AIC parameters, the network entity 105-d may send the control messages in a group-common channel (e.g., GC-PDCCH). In some cases, the network entity 105-d may transmit the scheduling information and the sidelink AIC parameters in different control messages (e.g., different DCI messages). In some other cases, the network entity 105-d may transmit the scheduling information and the sidelink AIC parameters in a same control message (e.g., a same DCI message).

In some cases, at 525, the UE 115-g may relay the sidelink AIC parameters to the UE 115-h. For example, if the network entity 105-d transmits the sidelink AIC parameters to the UE 115-g only, the UE 115-g may relay the sidelink AIC parameters to the UE 115-h. The UE 115-g may transmit the sidelink AIC parameters to the UE 115-h before performing a sidelink transmission to the UE 115-h. Otherwise, the UE 115-g may transmit the sidelink AIC parameters to the UE 115-h after performing the sidelink transmission to the UE 115-h. The UE 115-g may transmit the sidelink AIC parameters in SCI (e.g., stage 2 SCI), may broadcast the parameters to one or more surrounding UEs 115 including the UE 115-h, or the like.

At 530, the UE 115-g may perform the sidelink AIC for the sidelink transmission in accordance with the one or more parameters for the sidelink AIC. For example, at 535, the UE 115-g may perform the sidelink AIC using one or more AIC subcarriers for one or more time-frequency resources for a sidelink shared channel (e.g., PSSCH). The one or more time-frequency resources may be for the sidelink shared channel. In some cases, a number of the one or more AIC subcarriers may be based on the one or more time-frequency resources including an AGC time-frequency resource. For example, if the one or more time-frequency resources includes an AGC time-frequency resources, there may be more AIC subcarriers for the AIC operation.

At 540, the UE 115-g may perform the sidelink transmission to the UE 115-h based on performing the sidelink AIC at 530.

At 545, the UE 115-h may decode the sidelink transmission based on modifying the interference at the receiver according to the sidelink AIC parameters.

Figure 6:
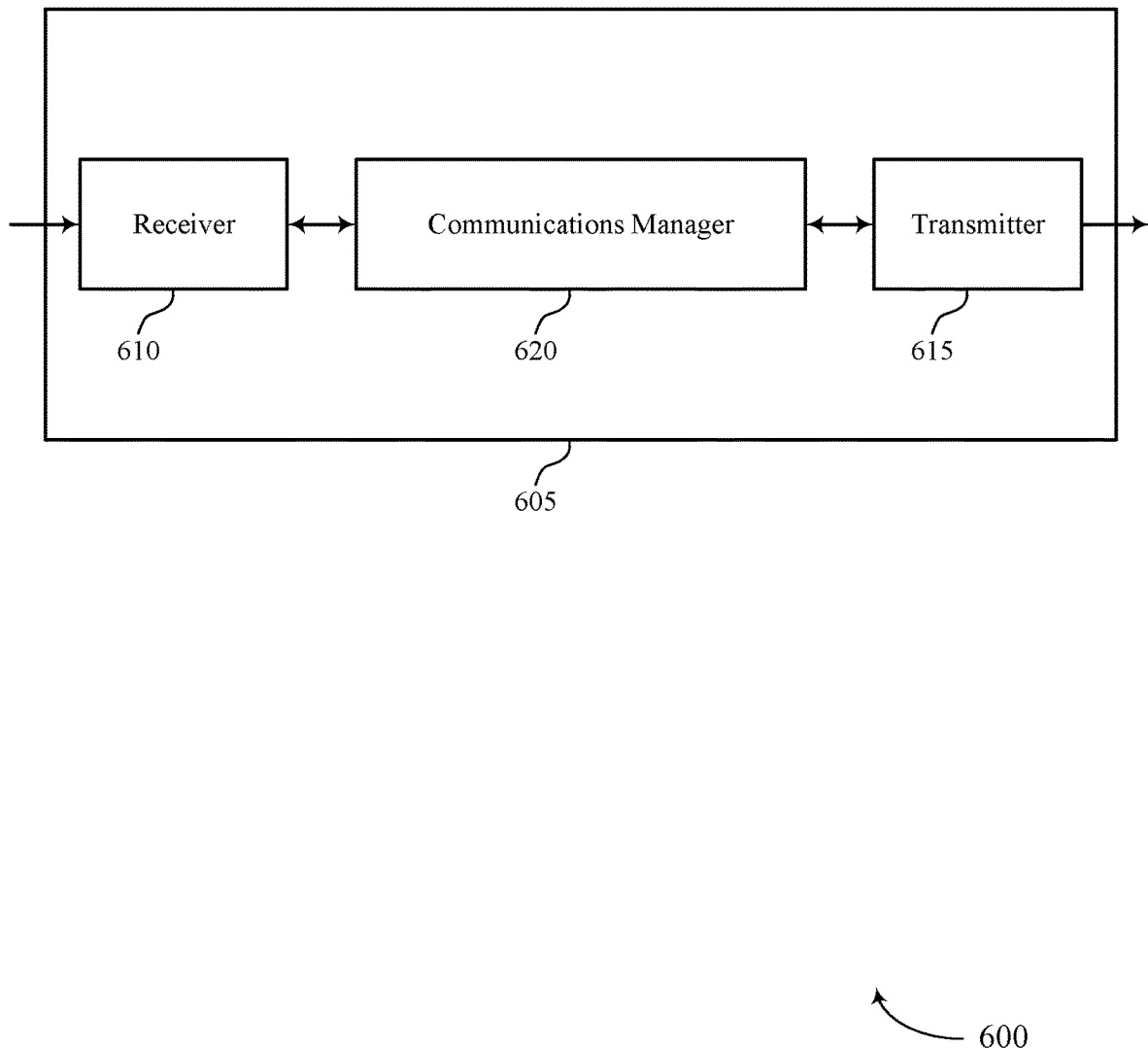
FIGS. 6 and 7 show block diagrams of devices that support AIC for sidelink transmissions in accordance with aspects of the present disclosure.

FIG. 6 shows a block diagram 600 of a device 605 that supports AIC for sidelink transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to AIC for sidelink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to AIC for sidelink transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of AIC for sidelink transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving, from a network entity, one or more control messages including scheduling information for a sidelink transmission to a second UE and one or more parameters for sidelink AIC for the sidelink transmission. The communications manager 620 may be configured as or otherwise support a means for performing the sidelink transmission to the second UE based on performing the sidelink AIC for the sidelink transmission in accordance with the one or more parameters for the sidelink AIC.

Additionally or alternatively, the communications manager 620 may support wireless communication at a first UE in accordance with examples as disclosed herein. For example, the communications manager 620 may be configured as or otherwise support a means for receiving one or more parameters for sidelink AIC for a sidelink transmission. The communications manager 620 may be configured as or otherwise support a means for receiving, from a second UE, the sidelink transmission based on modifying interference at a receiver of the first UE according to the one or more parameters. The communications manager 620 may be configured as or otherwise support a means for decoding the sidelink transmission based on modifying the interference at the receiver.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE 115 to perform sidelink AIC for a sidelink transmission based on receiving sidelink AIC parameters from a network entity 105, which may provide for reduced processing, reduced power consumption, more efficient utilization of communication resources, and the like.

Figure 7:
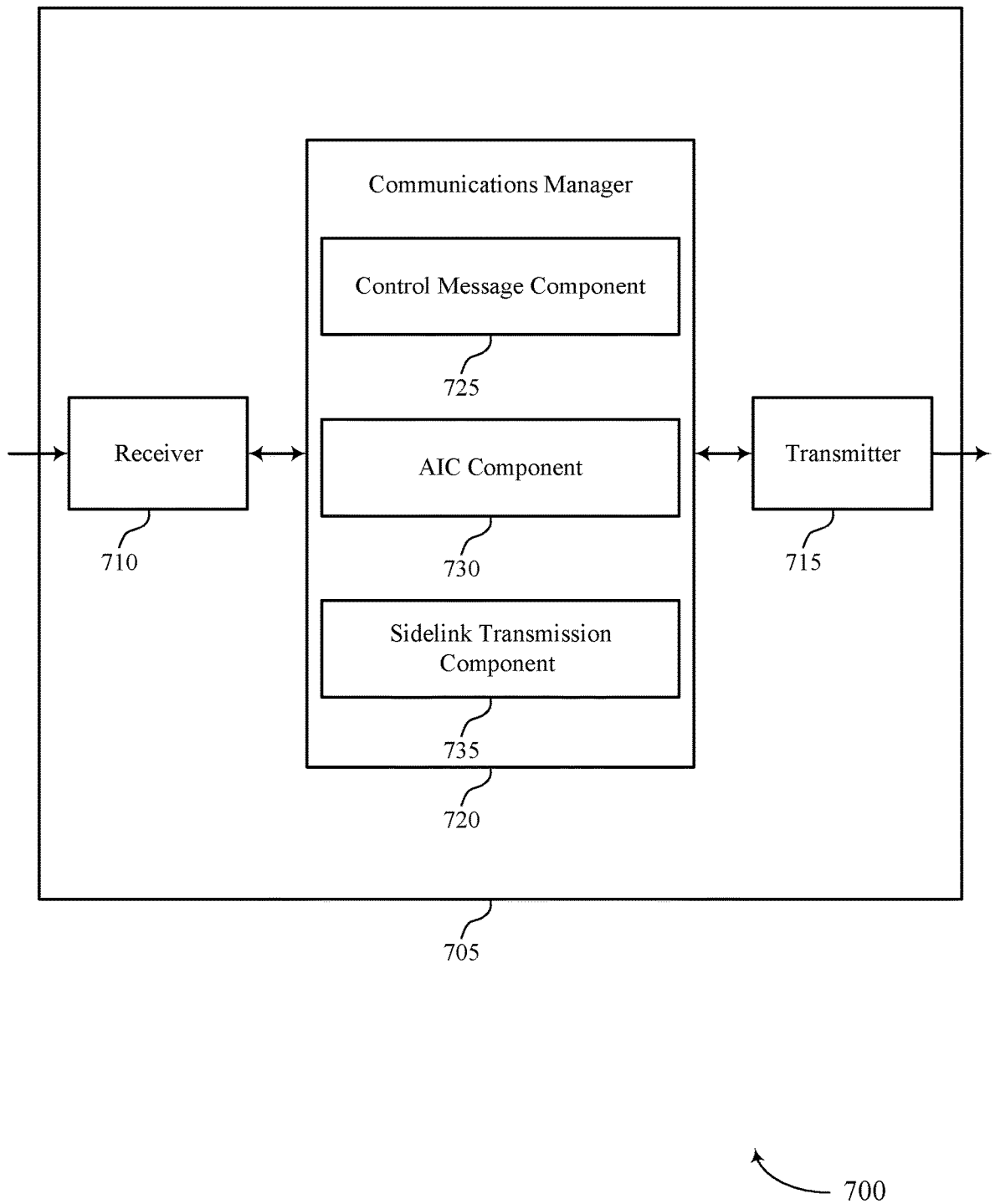

FIG. 7 shows a block diagram 700 of a device 705 that supports AIC for sidelink transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to AIC for sidelink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to AIC for sidelink transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of AIC for sidelink transmissions as described herein. For example, the communications manager 720 may include a control message component 725, an AIC component 730, an sidelink transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The control message component 725 may be configured as or otherwise support a means for receiving, from a network entity, one or more control messages including scheduling information for a sidelink transmission to a second UE and one or more parameters for sidelink AIC for the sidelink transmission. The AIC component 730 may be configured as or otherwise support a means for performing the sidelink transmission to the second UE based on performing the sidelink AIC for the sidelink transmission in accordance with the one or more parameters for the sidelink AIC.

Additionally or alternatively, the communications manager 720 may support wireless communication at a first UE in accordance with examples as disclosed herein. The AIC component 730 may be configured as or otherwise support a means for receiving one or more parameters for sidelink AIC for a sidelink transmission. The control message component 725 may be configured as or otherwise support a means for receiving, from a second UE, the sidelink transmission based on modifying interference at a receiver of the first UE according to the one or more parameters. The sidelink transmission component 735 may be configured as or otherwise support a means for decoding the sidelink transmission based on modifying the interference at the receiver.

Figure 8:
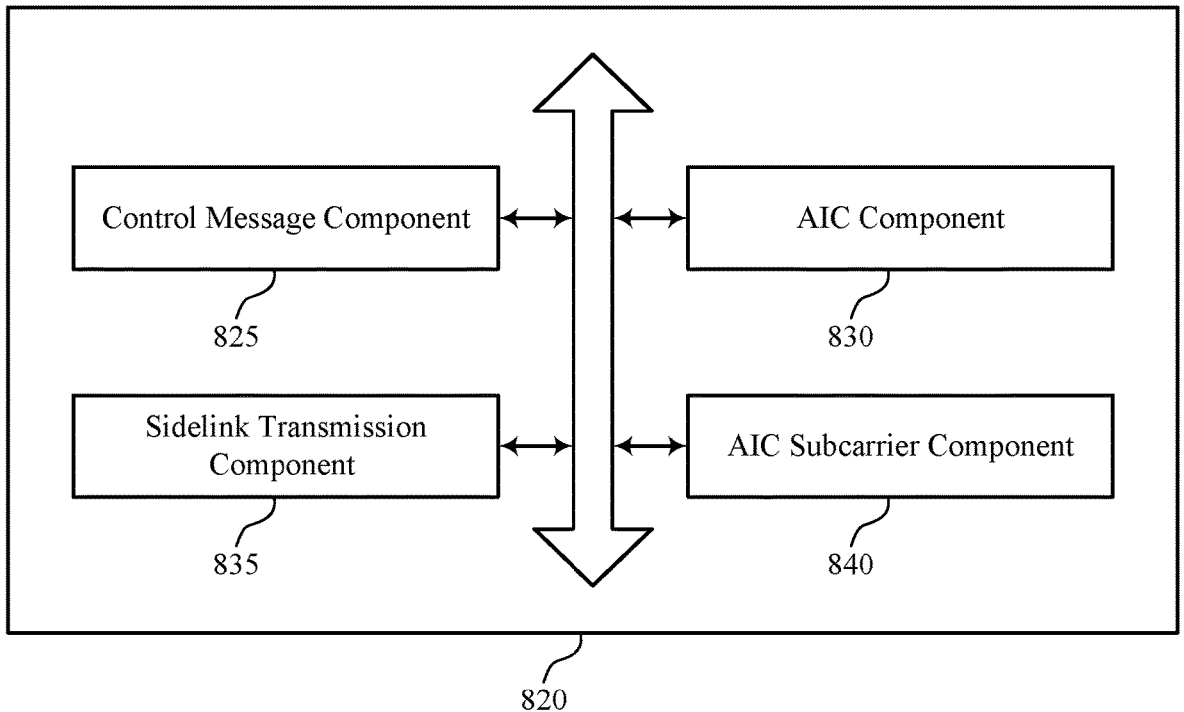
FIG. 8 shows a block diagram of a communications manager that supports AIC for sidelink transmissions in accordance with aspects of the present disclosure.

FIG. 8 shows a block diagram 800 of a communications manager 820 that supports AIC for sidelink transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of AIC for sidelink transmissions as described herein. For example, the communications manager 820 may include a control message component 825, an AIC component 830, an sidelink transmission component 835, an AIC subcarrier component 840, or any combination thereof. Each of these components may communicate, directly or indirectly, with one another (e.g., via one or more buses).

The communications manager 820 may support wireless communication at a first UE in accordance with examples as disclosed herein. The control message component 825 may be configured as or otherwise support a means for receiving, from a network entity, one or more control messages including scheduling information for a sidelink transmission to a second UE and one or more parameters for sidelink AIC for the sidelink transmission. The AIC component 830 may be configured as or otherwise support a means for performing the sidelink transmission to the second UE based on performing the sidelink AIC for the sidelink transmission in accordance with the one or more parameters for the sidelink AIC.

In some examples, to support receiving the one or more control messages, the control message component 825 may be configured as or otherwise support a means for receiving a first DCI message including the scheduling information for the sidelink transmission. In some examples, to support receiving the one or more control messages, the AIC component 830 may be configured as or otherwise support a means for receiving a second DCI message including the one or more parameters for the sidelink AIC.

In some examples, to support receiving the one or more control messages, the control message component 825 may be configured as or otherwise support a means for receiving a single DCI message including the scheduling information for the sidelink transmission and the one or more parameters for the sidelink AIC.

In some examples, to support performing the sidelink AIC for the sidelink transmission, the AIC subcarrier component 840 may be configured as or otherwise support a means for performing the sidelink AIC using one or more AIC subcarriers associated with one or more time-frequency resources for a sidelink shared channel.

In some examples, the one or more time-frequency resources are associated with a sidelink shared channel.

In some examples, a number of the one or more AIC subcarriers is based on the one or more time-frequency resources including an AIC to automatic gain control time-frequency resource.

In some examples, the AIC subcarrier component 840 may be configured as or otherwise support a means for receiving signaling configuring a set of multiple AIC subcarrier patterns, where the one or more parameters include an AIC subcarrier pattern of the set of multiple AIC subcarrier patterns.

In some examples, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

In some examples, the AIC component 830 may be configured as or otherwise support a means for transmitting, to the second UE, the one or more parameters for the sidelink AIC.

In some examples, the AIC component 830 may be configured as or otherwise support a means for transmitting the one or more parameters before performing the sidelink transmission to the second UE.

In some examples, the AIC component 830 may be configured as or otherwise support a means for transmitting the one or more parameters after performing the sidelink transmission to the second UE.

In some examples, the AIC component 830 may be configured as or otherwise support a means for transmitting the one or more parameters in sidelink control information.

In some examples, the AIC component 830 may be configured as or otherwise support a means for broadcasting the one or more parameters to a set of multiple UEs including the second UE.

In some examples, the control message component 825 may be configured as or otherwise support a means for receiving the one or more control messages in a group-common channel.

Additionally or alternatively, the communications manager 820 may support wireless communication at a first UE in accordance with examples as disclosed herein. In some examples, the AIC component 830 may be configured as or otherwise support a means for receiving one or more parameters for sidelink AIC for a sidelink transmission. In some examples, the control message component 825 may be configured as or otherwise support a means for receiving, from a second UE, the sidelink transmission based on modifying interference at a receiver of the first UE according to the one or more parameters. The sidelink transmission component 835 may be configured as or otherwise support a means for decoding the sidelink transmission based on modifying the interference at the receiver.

In some examples, to support receiving the one or more parameters, the control message component 825 may be configured as or otherwise support a means for receiving, from a network entity, a first DCI message including scheduling information for the sidelink transmission. In some examples, to support receiving the one or more parameters, the AIC component 830 may be configured as or otherwise support a means for receiving, from the network entity, a second DCI message including the one or more parameters for the sidelink AIC.

In some examples, to support receiving the one or more parameters, the control message component 825 may be configured as or otherwise support a means for receiving, from a network entity, a single DCI message including scheduling information for the sidelink transmission and the one or more parameters for the sidelink AIC.

In some examples, the AIC subcarrier component 840 may be configured as or otherwise support a means for receiving signaling configuring a set of multiple AIC subcarrier patterns, where the one or more parameters include an AIC subcarrier pattern of the set of multiple AIC subcarrier patterns.

In some examples, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

In some examples, the AIC component 830 may be configured as or otherwise support a means for receiving the one or more parameters before receiving the sidelink transmission from the second UE.

In some examples, the AIC component 830 may be configured as or otherwise support a means for receiving the one or more parameters after receiving the sidelink transmission from the second UE.

In some examples, the AIC component 830 may be configured as or otherwise support a means for receiving the one or more parameters in sidelink control information.

In some examples, the AIC component 830 may be configured as or otherwise support a means for receiving the one or more parameters in a group-common channel.

In some examples, the AIC component 830 may be configured as or otherwise support a means for receiving the one or more parameters for the sidelink AIC from the second UE, a network entity, or both.

Figure 9:
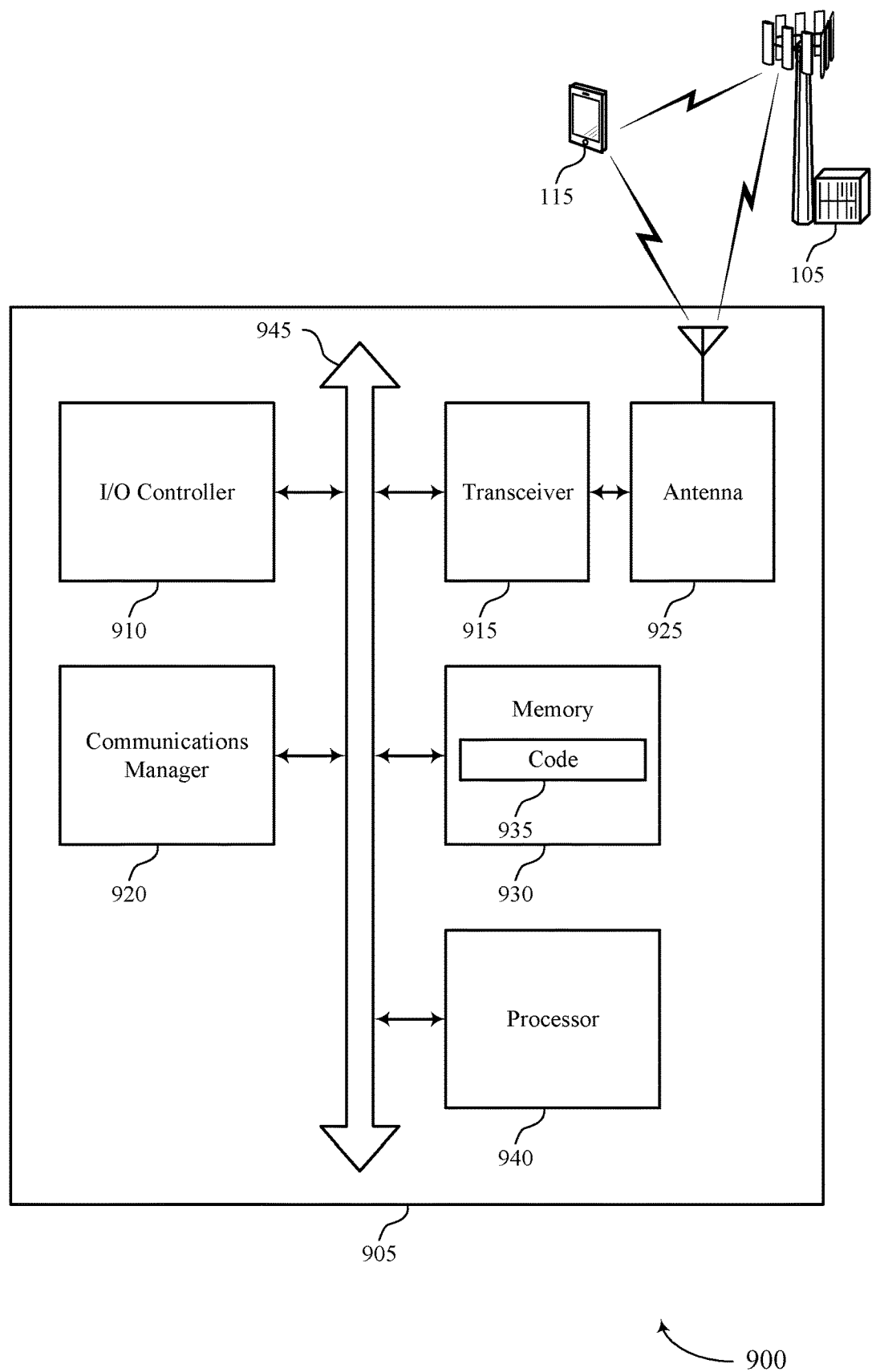
FIG. 9 shows a diagram of a system including a device that supports AIC for sidelink transmissions in accordance with aspects of the present disclosure.

FIG. 9 shows a diagram of a system 900 including a device 905 that supports AIC for sidelink transmissions in accordance with aspects of the present disclosure. The device 905 may be an example of or include the components of a device 605, a device 705, or a UE 115 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting AIC for sidelink transmissions). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, from a network entity, one or more control messages including scheduling information for a sidelink transmission to a second UE and one or more parameters for sidelink AIC for the sidelink transmission. The communications manager 920 may be configured as or otherwise support a means for performing the sidelink transmission to the second UE based on performing the sidelink AIC for the sidelink transmission in accordance with the one or more parameters for the sidelink AIC.

Additionally or alternatively, the communications manager 920 may support wireless communication at a first UE in accordance with examples as disclosed herein. For example, the communications manager 920 may be configured as or otherwise support a means for receiving one or more parameters for sidelink AIC for a sidelink transmission. The communications manager 920 may be configured as or otherwise support a means for receiving, from a second UE, the sidelink transmission based on modifying interference at a receiver of the first UE according to the one or more parameters. The communications manager 920 may be configured as or otherwise support a means for decoding the sidelink transmission based on modifying the interference at the receiver.

By including or configuring the communications manager 920 in accordance with examples as described herein, the device 905 may support techniques for a UE 115 to perform sidelink AIC for a sidelink transmission based on receiving sidelink AIC parameters from a network entity 105, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of AIC for sidelink transmissions as described herein, or the processor 940 and the memory 930 may be otherwise configured to perform or support such operations.

Figure 10:
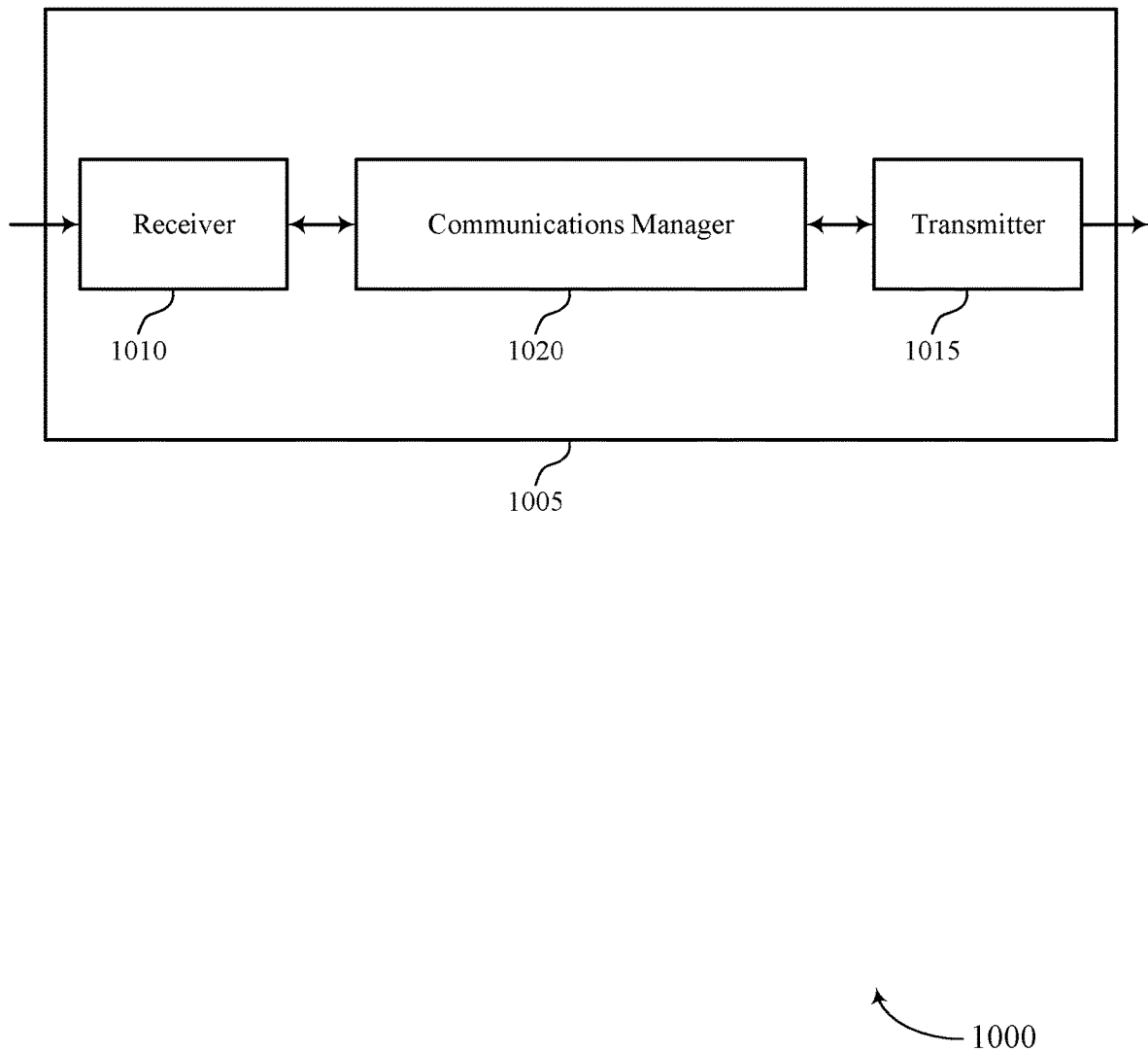
FIGS. 10 and 11 show block diagrams of devices that support AIC for sidelink transmissions in accordance with aspects of the present disclosure.

FIG. 10 shows a block diagram 1000 of a device 1005 that supports AIC for sidelink transmissions in accordance with aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to AIC for sidelink transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to AIC for sidelink transmissions). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of AIC for sidelink transmissions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for determining one or more parameters for sidelink AIC for a sidelink transmission between one or more user equipments (UEs). The communications manager 1020 may be configured as or otherwise support a means for transmitting, to the one or more UEs, one or more control messages including scheduling information for the sidelink transmission and the one or more parameters for the sidelink AIC for the sidelink transmission.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a UE 115 to perform sidelink AIC for a sidelink transmission based on receiving sidelink AIC parameters from a network entity 105, which may provide for reduced processing, reduced power consumption, more efficient utilization of communication resources, and the like.

Figure 11:
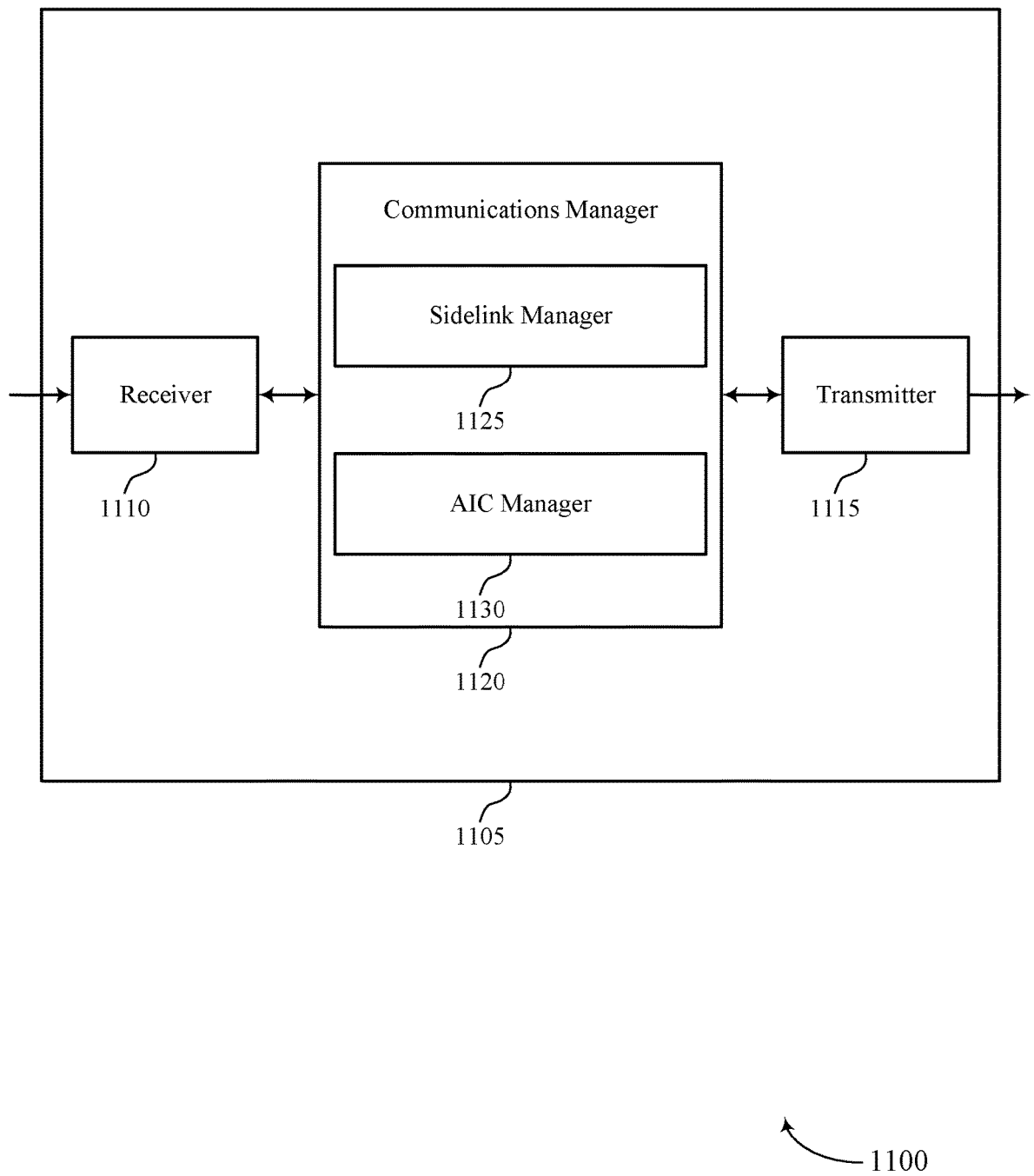

FIG. 11 shows a block diagram 1100 of a device 1105 that supports AIC for sidelink transmissions in accordance with aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to AIC for sidelink transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to AIC for sidelink transmissions). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of AIC for sidelink transmissions as described herein. For example, the communications manager 1120 may include a sidelink manager 1125 an AIC manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The sidelink manager 1125 may be configured as or otherwise support a means for determining one or more parameters for sidelink AIC for a sidelink transmission between one or more user equipments (UEs). The AIC manager 1130 may be configured as or otherwise support a means for transmitting, to the one or more UEs, one or more control messages including scheduling information for the sidelink transmission and the one or more parameters for the sidelink AIC for the sidelink transmission.

Figure 12:
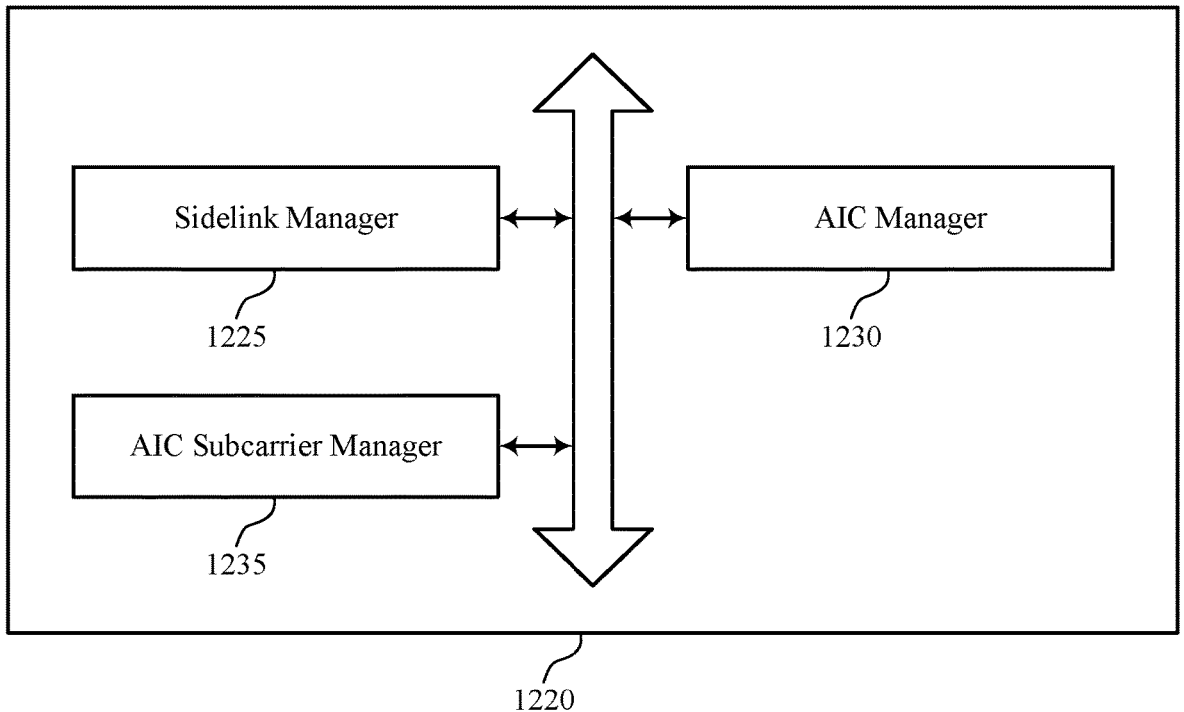
FIG. 12 shows a block diagram of a communications manager that supports AIC for sidelink transmissions in accordance with aspects of the present disclosure.

FIG. 12 shows a block diagram 1200 of a communications manager 1220 that supports AIC for sidelink transmissions in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of AIC for sidelink transmissions as described herein. For example, the communications manager 1220 may include a sidelink manager 1225, an AIC manager 1230, an AIC subcarrier manager 1235, or any combination thereof. Each of these components may communicate, directly or indirectly, with one another (e.g., via one or more buses).

The communications manager 1220 may support wireless communication at a network entity in accordance with examples as disclosed herein. The sidelink manager 1225 may be configured as or otherwise support a means for determining one or more parameters for sidelink AIC for a sidelink transmission between one or more user equipments (UEs). The AIC manager 1230 may be configured as or otherwise support a means for transmitting, to the one or more UEs, one or more control messages including scheduling information for the sidelink transmission and the one or more parameters for the sidelink AIC for the sidelink transmission.

In some examples, to support transmitting the one or more control messages, the sidelink manager 1225 may be configured as or otherwise support a means for transmitting a first DCI message including the scheduling information for the sidelink transmission. In some examples, to support transmitting the one or more control messages, the AIC manager 1230 may be configured as or otherwise support a means for transmitting a second DCI message including the one or more parameters for the sidelink AIC.

In some examples, to support transmitting the one or more control messages, the sidelink manager 1225 may be configured as or otherwise support a means for transmitting a single DCI message including the scheduling information for the sidelink transmission and the one or more parameters for the sidelink AIC.

In some examples, the AIC subcarrier manager 1235 may be configured as or otherwise support a means for transmitting signaling configuring a set of multiple AIC subcarrier patterns at the one or more UEs, where the one or more parameters include an AIC subcarrier pattern of the set of multiple AIC subcarrier patterns.

In some examples, the one or more parameters include an AIC optimization area, a time resource corresponding to a minimized leakage, a frequency resource corresponding to the minimized leakage, a number of AIC subcarriers, an AIC subcarrier position, an AIC subcarrier pattern, an indication of one or more UEs to perform the sidelink AIC, a symbol index associated with the sidelink AIC, or any combination thereof.

In some examples, the sidelink manager 1225 may be configured as or otherwise support a means for transmitting the one or more control messages in a group-common channel.

Figure 13:
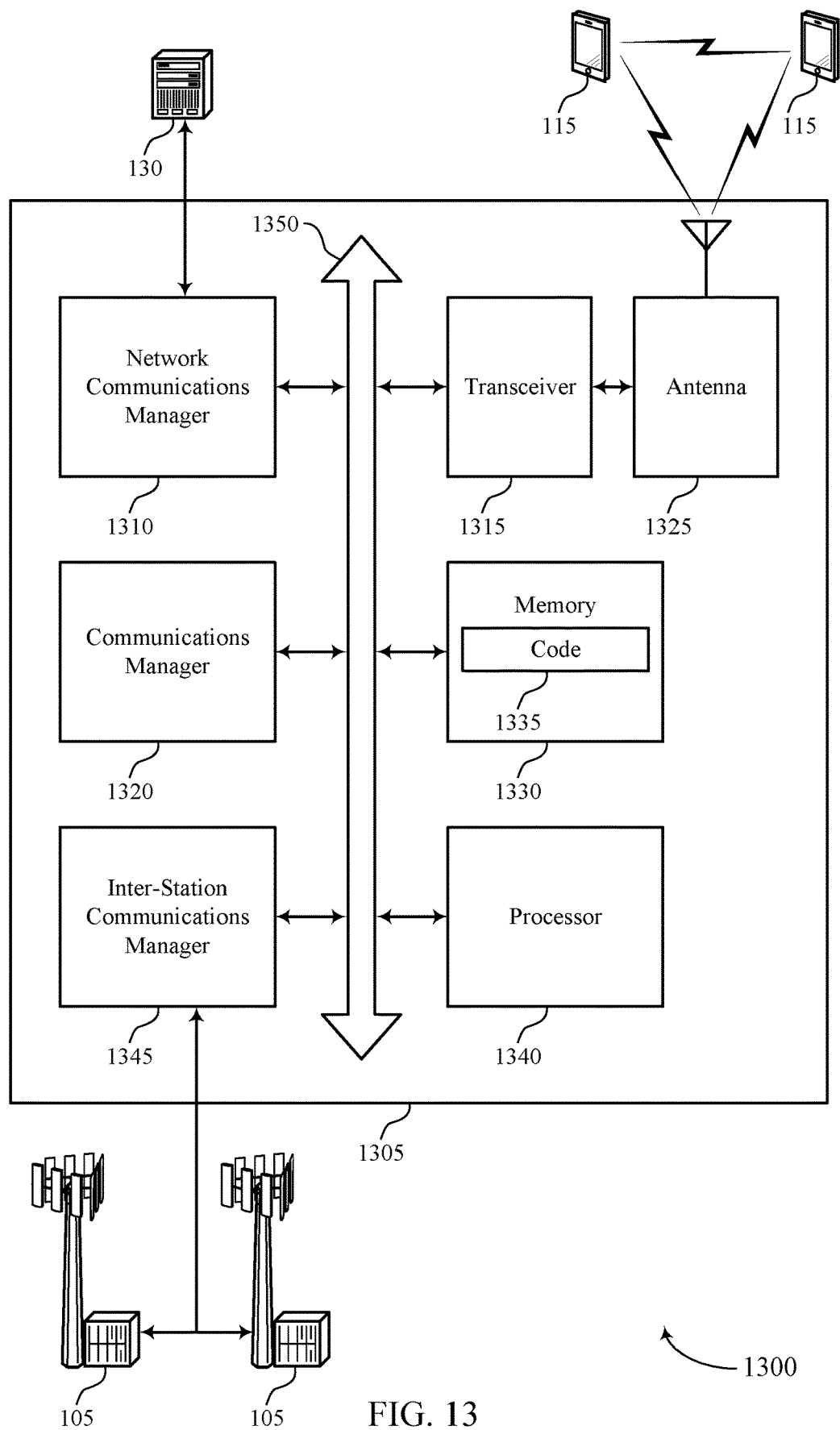
FIG. 13 shows a diagram of a system including a device that supports AIC for sidelink transmissions in accordance with aspects of the present disclosure.

FIG. 13 shows a diagram of a system 1300 including a device 1305 that supports AIC for sidelink transmissions in accordance with aspects of the present disclosure. The device 1305 may be an example of or include the components of a device 1005, a device 1105, or a network entity 105 as described herein. The device 1305 may communicate wirelessly with one or more network entities 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting AIC for sidelink transmissions). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for determining one or more parameters for sidelink AIC for a sidelink transmission between one or more user equipments (UEs). The communications manager 1320 may be configured as or otherwise support a means for transmitting, to the one or more UEs, one or more control messages including scheduling information for the sidelink transmission and the one or more parameters for the sidelink AIC for the sidelink transmission.

By including or configuring the communications manager 1320 in accordance with examples as described herein, the device 1305 may support techniques for a UE 115 to perform sidelink AIC for a sidelink transmission based on receiving sidelink AIC parameters from a network entity 105, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of AIC for sidelink transmissions as described herein, or the processor 1340 and the memory 1330 may be otherwise configured to perform or support such operations.

Figure 14:
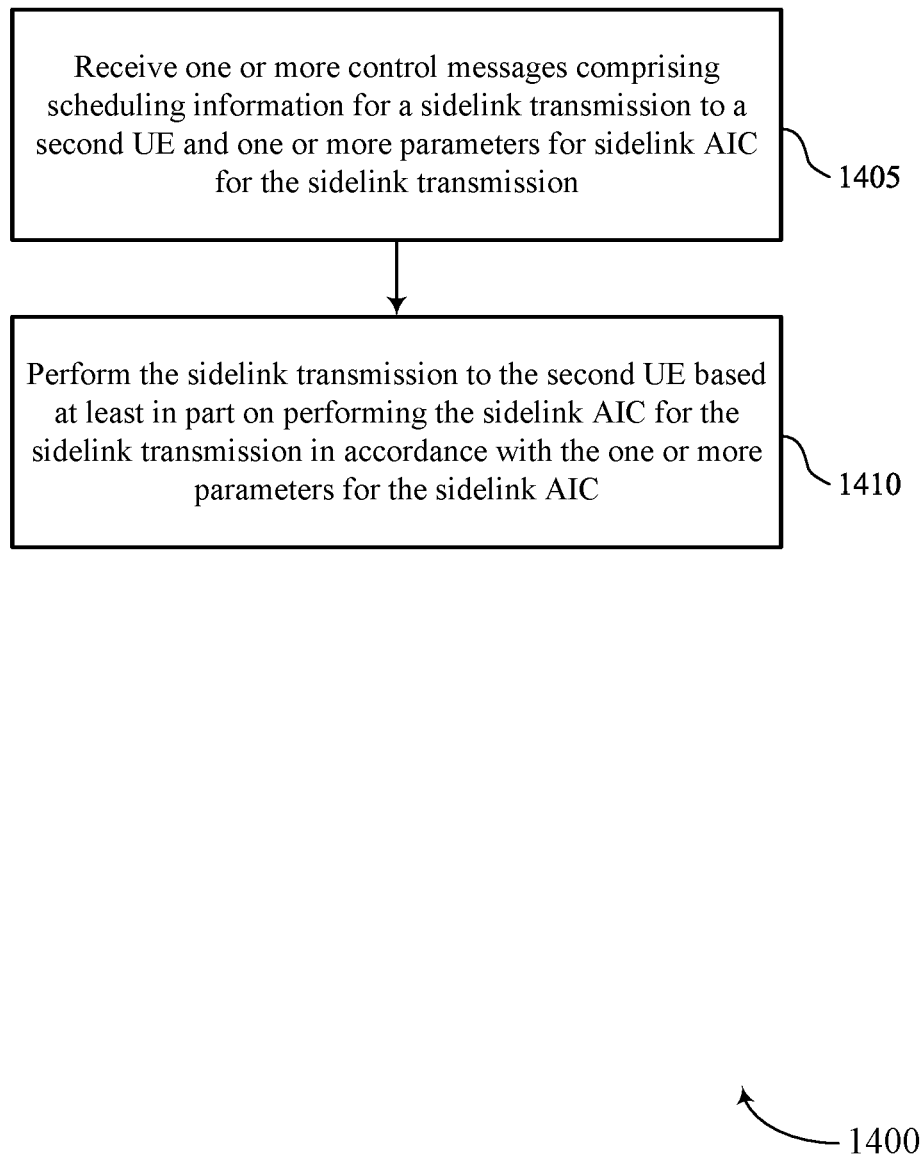
FIGS. 14 through 18 show flowcharts illustrating methods that support AIC for sidelink transmissions in accordance with aspects of the present disclosure.

FIG. 14 shows a flowchart illustrating a method 1400 that supports AIC for sidelink transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware. Also, as used herein, the phrase "a set" shall be construed as including the possibility of a set with one member. That is, the phrase "a set" shall be construed in the same manner as "one or more."

At 1405, the method may include receiving, from a network entity, one or more control messages including scheduling information for a sidelink transmission to a second UE and one or more parameters for sidelink AIC for the sidelink transmission. The operations of 1405 may be performed in accordance with examples as disclosed herein. In some examples, aspects of the operations of 1405 may be performed by a control message component 825 as described with reference to FIG. 8.

At 1410, the method may include performing the sidelink transmission to the second UE based on performing the sidelink AIC for the sidelink transmission in accordance with the one or more parameters for the sidelink AIC. The operations of 1410 may be performed in accordance with examples as disclosed herein. In some examples, aspects of the operations of 1410 may be performed by an AIC component 830 as described with reference to FIG. 8.

Figure 15:
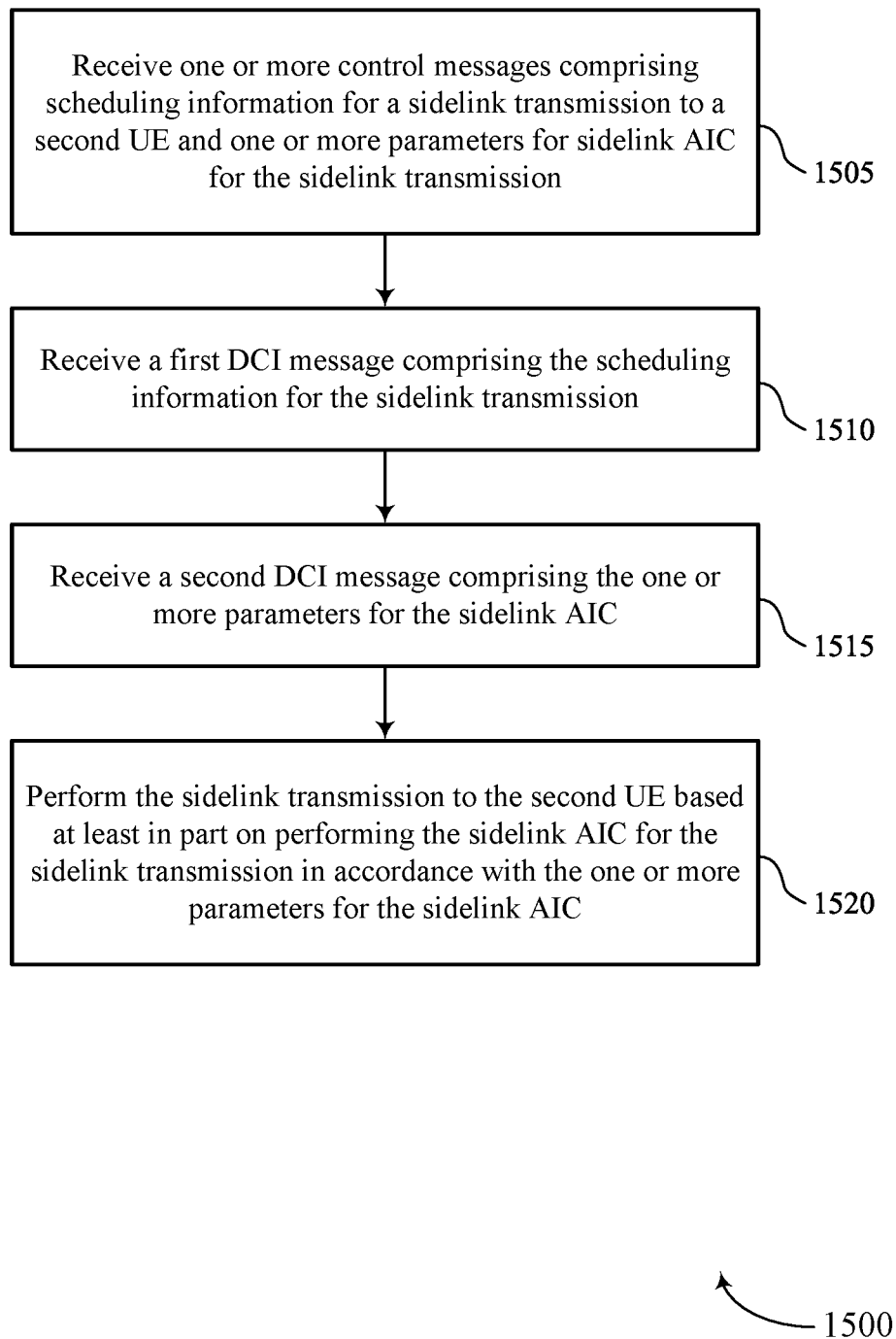

FIG. 15 shows a flowchart illustrating a method 1500 that supports AIC for sidelink transmissions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware. Also, as used herein, the phrase "a set" shall be construed as including the possibility of a set with one member. That is, the phrase "a set" shall be construed in the same manner as "one or more."

At 1505, the method may include receiving, from a network entity, one or more control messages including scheduling information for a sidelink transmission to a second UE and one or more parameters for sidelink AIC for the sidelink transmission. The operations of 1505 may be performed in accordance with examples as disclosed herein. In some examples, aspects of the operations of 1505 may be performed by a control message component 825 as described with reference to FIG. 8.

At 1510, the method may include receiving a first DCI message including the scheduling information for the sidelink transmission. The operations of 1510 may be performed in accordance with examples as disclosed herein. In some examples, aspects of the operations of 1510 may be performed by a control message component 825 as described with reference to FIG. 8.

At 1515, the method may include receiving a second DCI message including the one or more parameters for the sidelink AIC. The operations of 1515 may be performed in accordance with examples as disclosed herein. In some examples, aspects of the operations of 1515 may be performed by an AIC component 830 as described with reference to FIG. 8.

At 1520, the method may include performing the sidelink transmission to the second UE based on performing the sidelink AIC for the sidelink transmission in accordance with the one or more parameters for the sidelink AIC. The operations of 1520 may be performed in accordance with examples as disclosed herein. In some examples, aspects of the operations of 1520 may be performed by an AIC component 830 as described with reference to FIG. 8.

Figure 16:
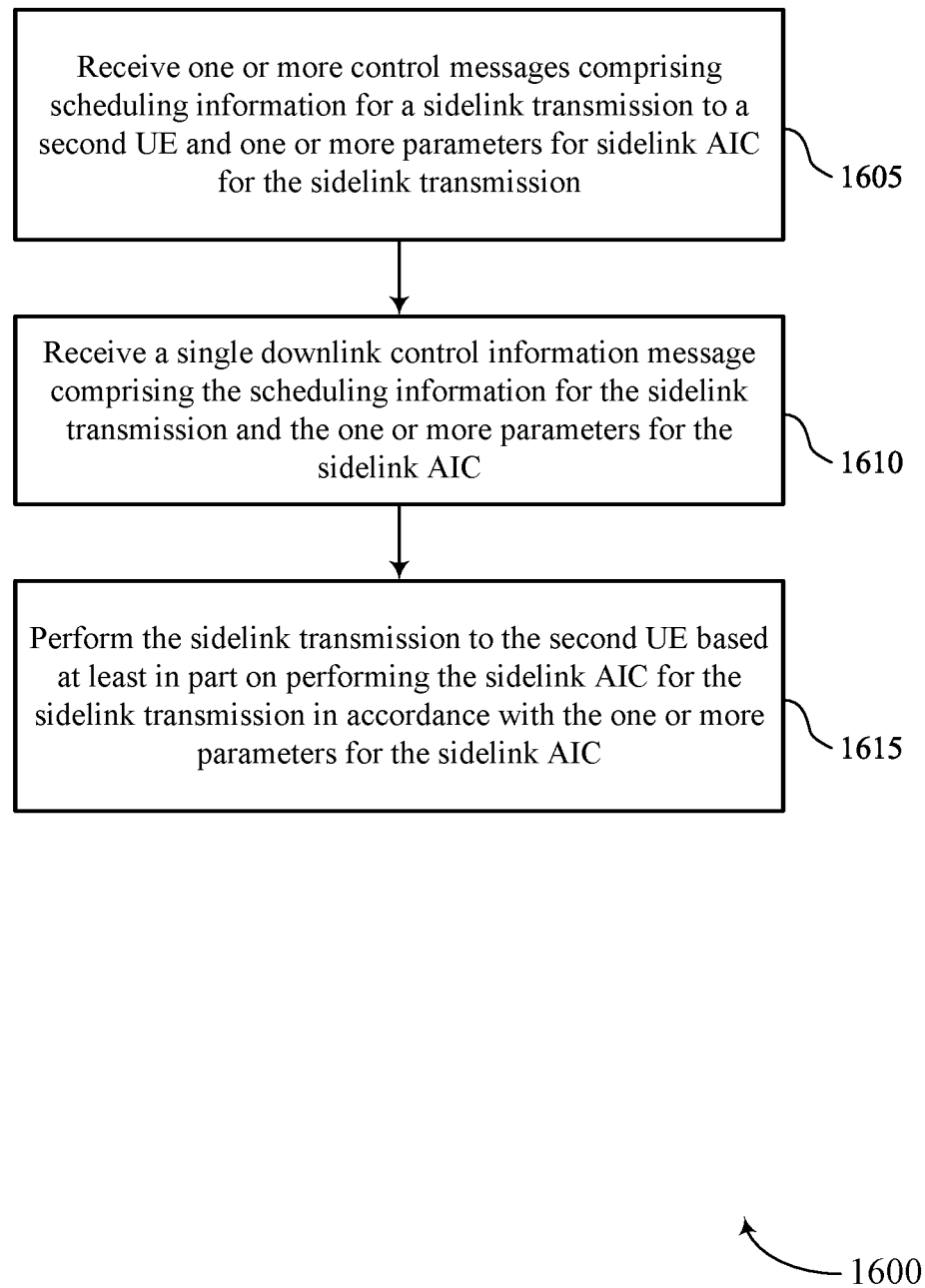

FIG. 16 shows a flowchart illustrating a method 1600 that supports AIC for sidelink transmissions in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a network entity, one or more control messages including scheduling information for a sidelink transmission to a second UE and one or more parameters for sidelink AIC for the sidelink transmission. The operations of 1605 may be performed in accordance with examples as disclosed herein. In some examples, aspects of the operations of 1605 may be performed by a control message component 825 as described with reference to FIG. 8.

At 1610, the method may include receiving a single DCI message including the scheduling information for the sidelink transmission and the one or more parameters for the sidelink AIC. The operations of 1610 may be performed in accordance with examples as disclosed herein. In some examples, aspects of the operations of 1610 may be performed by a control message component 825 as described with reference to FIG. 8.

At 1615, the method may include performing the sidelink transmission to the second UE based on performing the sidelink AIC for the sidelink transmission in accordance with the one or more parameters for the sidelink AIC. The operations of 1615 may be performed in accordance with examples as disclosed herein. In some examples, aspects of the operations of 1615 may be performed by an AIC component 830 as described with reference to FIG. 8.

Figure 17:
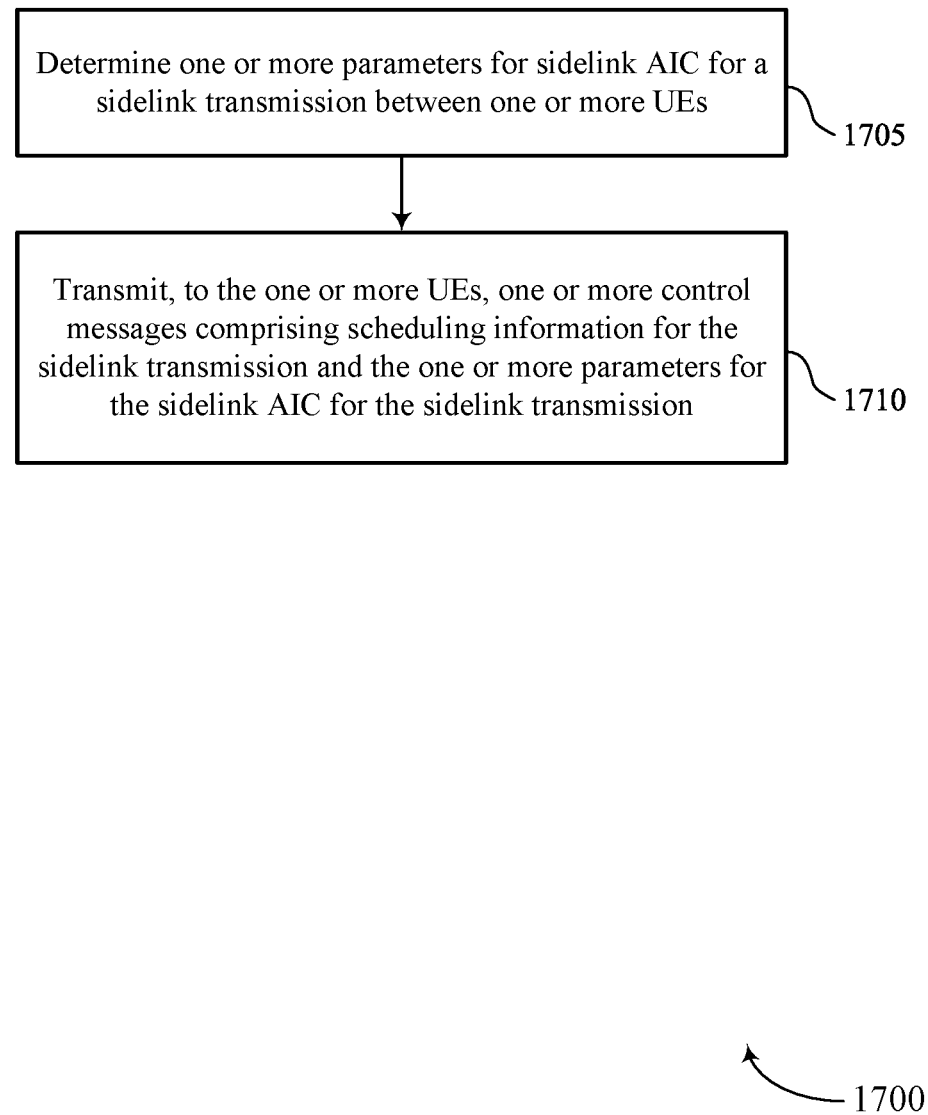

FIG. 17 shows a flowchart illustrating a method 1700 that supports AIC for sidelink transmissions in accordance with aspects of the present disclosure. The operations of the method 1700 may be implemented by a network entity or its components as described herein. For example, the operations of the method 1700 may be performed by a network entity 105 as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1705, the method may include determining one or more parameters for sidelink AIC for a sidelink transmission between one or more user equipments (UEs). The operations of 1705 may be performed in accordance with examples as disclosed herein. In some examples, aspects of the operations of 1705 may be performed by a sidelink manager 1225 as described with reference to FIG. 12.

At 1710, the method may include transmitting, to the one or more UEs, one or more control messages including scheduling information for the sidelink transmission and the one or more parameters for the sidelink AIC for the sidelink transmission. The operations of 1710 may be performed in accordance with examples as disclosed herein. In some examples, aspects of the operations of 1710 may be performed by an AIC manager 1230 as described with reference to FIG. 12.

Figure 18:
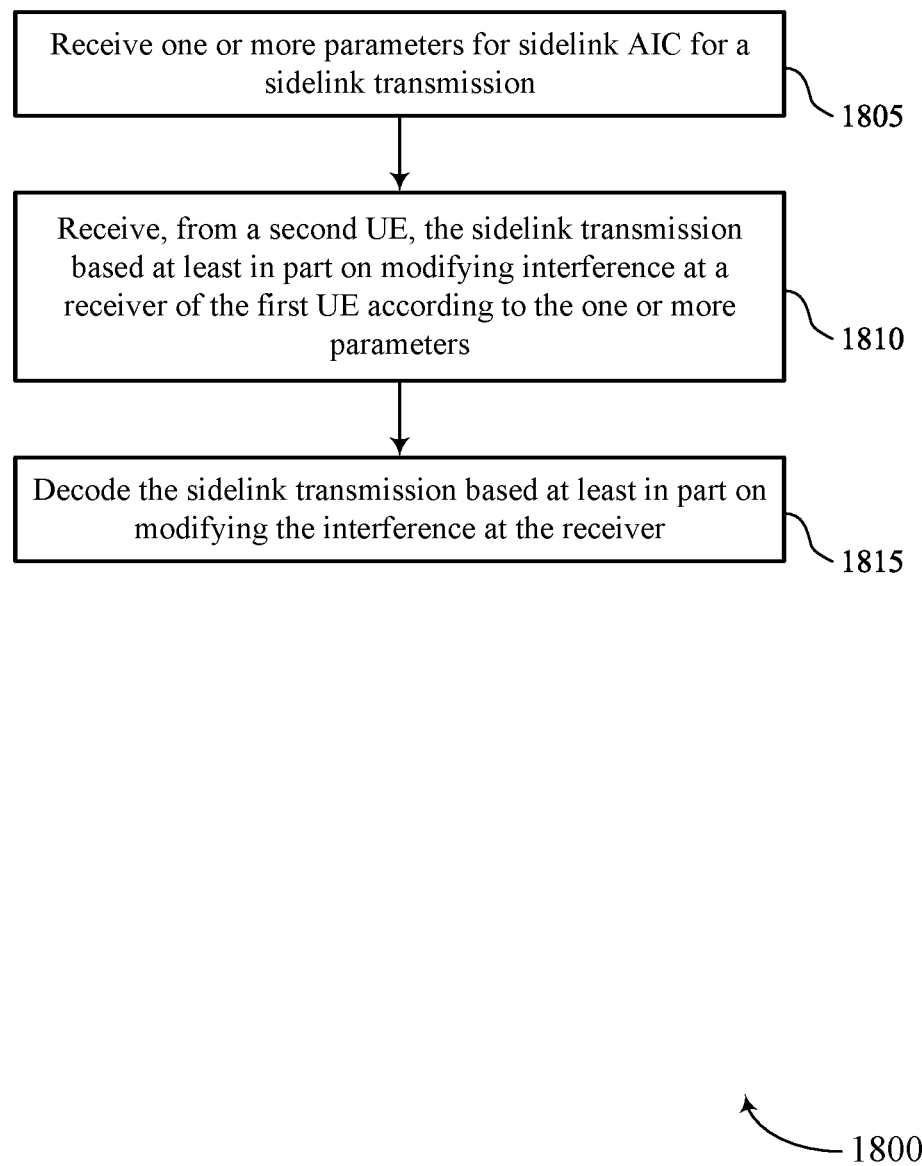

FIG. 18 shows a flowchart illustrating a method 1800 that supports AIC for sidelink transmissions in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving one or more parameters for sidelink AIC for a sidelink transmission. The operations of 1805 may be performed in accordance with examples as disclosed herein. In some examples, aspects of the operations of 1805 may be performed by an AIC component 830 as described with reference to FIG. 8.

At 1810, the method may include receiving, from a second UE, the sidelink transmission based on modifying interference at a receiver of the first UE according to the one or more parameters. The operations of 1810 may be performed in accordance with examples as disclosed herein. In some examples, aspects of the operations of 1810 may be performed by a control message component 825 as described with reference to FIG. 8.

At 1815, the method may include decoding the sidelink transmission based on modifying the interference at the receiver. The operations of 1815 may be performed in accordance with examples as disclosed herein. In some examples, aspects of the operations of 1815 may be performed by a sidelink transmission component 835 as described with reference to FIG. 8.

The following provides an overview of aspects of the present disclosure:

Aspect 1: A method for wireless communication at a first UE, comprising: receiving one or more control messages comprising scheduling information for a sidelink transmission to a second UE and one or more parameters for sidelink active interference cancellation for the sidelink transmission; and performing the sidelink transmission to the second UE based at least in part on performing the sidelink active interference cancellation for the sidelink transmission in accordance with the one or more parameters for the sidelink active interference cancellation.

Aspect 2: The method of aspect 1, wherein receiving the one or more control messages further comprises: receiving a first downlink control information message comprising the scheduling information for the sidelink transmission; and receiving a second downlink control information message comprising the one or more parameters for the sidelink active interference cancellation.

Aspect 3: The method of aspect 1, wherein receiving the one or more control messages further comprises: receiving a single downlink control information message comprising the scheduling information for the sidelink transmission and the one or more parameters for the sidelink active interference cancellation.

Aspect 4: The method of any of aspects 1 through 3, wherein performing the sidelink active interference cancellation for the sidelink transmission further comprises: performing the sidelink active interference cancellation using one or more active interference cancellation subcarriers associated with one or more time-frequency resources for a sidelink shared channel.

Aspect 5: The method of aspect 4, wherein the one or more time-frequency resources are associated with a sidelink shared channel.

Aspect 6: The method of any of aspects 4 through 5, wherein a number of the one or more active interference cancellation subcarriers is based at least in part on the one or more time-frequency resources comprising an active interference cancellation to automatic gain control time-frequency resource.

Aspect 7: The method of any of aspects 1 through 6 further comprising: receiving signaling configuring a plurality of active interference cancellation subcarrier patterns, wherein the one or more parameters comprise an active interference cancellation subcarrier pattern of the plurality of active interference cancellation subcarrier patterns.

Aspect 8: The method of any of aspects 1 through 7, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, an indication of one or more UEs to perform the sidelink active interference cancellation, a symbol index associated with the sidelink active interference cancellation, or any combination thereof.

Aspect 9: The method of any of aspects 1 through 8 further comprising: transmitting, to the second UE, the one or more parameters for the sidelink active interference cancellation.

Aspect 10: The method of any of aspects 1 through 9 further comprising: transmitting the one or more parameters before performing the sidelink transmission to the second UE.

Aspect 11: The method of any of aspects 1 through 10 further comprising: transmitting the one or more parameters after performing the sidelink transmission to the second UE.

Aspect 12: The method of any of aspects 1 through 11 further comprising: transmitting the one or more parameters in sidelink control information.

Aspect 13: The method of any of aspects 1 through 12 further comprising: broadcasting the one or more parameters to a plurality of UEs comprising the second UE.

Aspect 14: The method of any of aspects 1 through 13 further comprising: receiving the one or more control messages in a group-common channel.

Aspect 15: A method for wireless communication at a network entity, comprising: determining one or more parameters for sidelink active interference cancellation for a sidelink transmission between one or more user equipments (UEs); and transmitting, to the one or more UEs, one or more control messages comprising scheduling information for the sidelink transmission and the one or more parameters for the sidelink active interference cancellation for the sidelink transmission.

Aspect 16: The method of aspect 15, wherein transmitting the one or more control messages further comprises: transmitting a first downlink control information message comprising the scheduling information for the sidelink transmission; and transmitting a second downlink control information message comprising the one or more parameters for the sidelink active interference cancellation.

Aspect 17: The method of aspect 15, wherein transmitting the one or more control messages further comprises: transmitting a single downlink control information message comprising the scheduling information for the sidelink transmission and the one or more parameters for the sidelink active interference cancellation.

Aspect 18: The method of any of aspects 15 through 17 further comprising: transmitting signaling configuring a plurality of active interference cancellation subcarrier patterns at the one or more UEs, wherein the one or more parameters comprise an active interference cancellation subcarrier pattern of the plurality of active interference cancellation subcarrier patterns.

Aspect 19: The method of any of aspects 15 through 18, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, an indication of one or more UEs to perform the sidelink active interference cancellation, a symbol index associated with the sidelink active interference cancellation, or any combination thereof.

Aspect 20: The method of any of aspects 15 through 19 further comprising: transmitting the one or more control messages in a group-common channel.

Aspect 21: A method for wireless communication at a first UE, comprising: receiving one or more parameters for sidelink active interference cancellation for a sidelink transmission; receiving, from a second UE, the sidelink transmission based at least in part on modifying interference at a receiver of the first UE according to the one or more parameters; and decoding the sidelink transmission based at least in part on modifying the interference at the receiver.

Aspect 22: The method of aspect 21, wherein receiving the one or more parameters further comprises: receiving a first downlink control information message comprising scheduling information for the sidelink transmission; and receiving a second downlink control information message comprising the one or more parameters for the sidelink active interference cancellation.

Aspect 23: The method of aspect 21, wherein receiving the one or more parameters further comprises: receiving a single downlink control information message comprising scheduling information for the sidelink transmission and the one or more parameters for the sidelink active interference cancellation.

Aspect 24: The method of any of aspects 21 through 23 further comprising: receiving signaling configuring a plurality of active interference cancellation subcarrier patterns, wherein the one or more parameters comprise an active interference cancellation subcarrier pattern of the plurality of active interference cancellation subcarrier patterns.

Aspect 25: The method of any of aspects 21 through 24, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, an indication of one or more UEs to perform the sidelink active interference cancellation, a symbol index associated with the sidelink active interference cancellation, or any combination thereof.

Aspect 26: The method of any of aspects 21 through 25 further comprising: receiving the one or more parameters before receiving the sidelink transmission from the second UE.

Aspect 27: The method of any of aspects 21 through 26 further comprising: receiving the one or more parameters after receiving the sidelink transmission from the second UE.

Aspect 28: The method of any of aspects 21 through 27 further comprising: receiving the one or more parameters in sidelink control information.

Aspect 29: The method of any of aspects 21 through 28 further comprising: receiving the one or more parameters for the sidelink active interference cancellation from the second UE, a network entity, or both.

Aspect 30: An apparatus for wireless communication at a first UE, comprising a processor; memory coupled with the processor; and instructions stored in the memory and executable by the processor to cause the apparatus to perform a method of any of aspects 1 through 14.

Aspect 31: An apparatus for wireless communication at a first UE, comprising at least one means for performing a method of any of aspects 1 through 14.

Aspect 32: A non-transitory computer-readable medium storing code for wireless communication at a first UE, the code comprising instructions executable by a processor to perform a method of any of aspects 1 through 14.

Aspect 33: An apparatus for wireless communication at a network entity, comprising a processor; memory coupled with the processor; and instructions stored in the memory and executable by the processor to cause the apparatus to perform a method of any of aspects 15 through 20.

Aspect 34: An apparatus for wireless communication at a network entity, comprising at least one means for performing a method of any of aspects 15 through 20.

Aspect 35: A non-transitory computer-readable medium storing code for wireless communication at a network entity, the code comprising instructions executable by a processor to perform a method of any of aspects 15 through 20.

Aspect 36: An apparatus for wireless communication at a first UE, comprising a processor; memory coupled with the processor; and instructions stored in the memory and executable by the processor to cause the apparatus to perform a method of any of aspects 21 through 29.

Aspect 37: An apparatus for wireless communication at a first UE, comprising at least one means for performing a method of any of aspects 21 through 29.

Aspect 38: A non-transitory computer-readable medium storing code for wireless communication at a first UE, the code comprising instructions executable by a processor to perform a method of any of aspects 21 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    one or more memories storing processor-executable code; and
    one or more processors coupled with the one or more memories and operable to execute the code to cause the apparatus to:
        receive one or more control messages comprising scheduling information for a sidelink transmission to a second UE and one or more parameters for sidelink active interference cancellation for the sidelink transmission, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, or any combination thereof; and
        perform the sidelink transmission to the second UE in accordance with the one or more parameters for the sidelink active interference cancellation.

2. The apparatus of claim 1, wherein, to receive the one or more control messages, the one or more processors are operable to execute the code to cause the apparatus to:
    receive a first downlink control information message comprising the scheduling information for the sidelink transmission; and receive a second downlink control information message comprising the one or more parameters for the sidelink active interference cancellation.

3. The apparatus of claim 1, wherein, to receive the one or more control messages, the one or more processors are operable to execute the code to cause the apparatus to:
receive a single downlink control information message comprising the scheduling information for the sidelink transmission and the one or more parameters for the sidelink active interference cancellation.

4. The apparatus of claim 1, wherein, to perform the sidelink active interference cancellation for the sidelink, the one or more processors are operable to execute the code to cause the apparatus to:
perform the sidelink active interference cancellation using one or more active interference cancellation subcarriers associated with one or more time-frequency resources for a sidelink shared channel.

5. The apparatus of claim 4, wherein the one or more time-frequency resources are associated with the sidelink shared channel.

6. The apparatus of claim 4, wherein a number of the one or more active interference cancellation subcarriers is based at least in part on the one or more time-frequency resources comprising an active interference cancellation to automatic gain control time-frequency resource.

7. The apparatus of claim 1, wherein the one or more processors are further operable to execute the code to cause the apparatus to:
receive signaling configuring a plurality of active interference cancellation subcarrier patterns, wherein the one or more parameters comprise an active interference cancellation subcarrier pattern of the plurality of active interference cancellation subcarrier patterns.

8. The apparatus of claim 1, wherein the one or more parameters comprise an indication of one or more UEs to perform the sidelink active interference cancellation, a symbol index associated with the sidelink active interference cancellation, or any combination thereof.

9. The apparatus of claim 1, wherein the one or more processors are further operable to execute the code to cause the apparatus to:
transmit, to the second UE, the one or more parameters for the sidelink active interference cancellation.

10. The apparatus of claim 1, wherein the one or more processors are further operable to execute the code to cause the apparatus to:
transmit, to the second UE, the one or more parameters before performing the sidelink transmission to the second UE.

11. The apparatus of claim 1, wherein the one or more processors are further operable to execute the code to cause the apparatus to:
transmit, to the second UE, the one or more parameters after performing the sidelink transmission to the second UE.

12. The apparatus of claim 1, wherein the one or more processors are further operable to execute the code to cause the apparatus to:
transmit, to the second UE, the one or more parameters in sidelink control information.

13. The apparatus of claim 1, wherein the one or more processors are further operable to execute the code to cause the apparatus to:
broadcast the one or more parameters to a plurality of UEs comprising the second UE.

14. The apparatus of claim 1, wherein the one or more processors are further operable to execute the code to cause the apparatus to:
receive the one or more control messages in a group-common channel.

15. An apparatus for wireless communication at a network entity, comprising:
one or more memories storing processor-executable code; and
one or more processors coupled with the one or more memories and operable to execute the code to cause the apparatus to:
determine one or more parameters for sidelink active interference cancellation for a sidelink transmission between one or more user equipments (UEs); and
transmit, to the one or more UEs, one or more control messages comprising scheduling information for the sidelink transmission and the one or more parameters for the sidelink active interference cancellation for the sidelink transmission, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, or any combination thereof.

16. The apparatus of claim 15, wherein, to transmit the one or more control messages, the one or more processors are operable to execute the code to cause the apparatus to:
transmit a first downlink control information message comprising the scheduling information for the sidelink transmission; and
transmit a second downlink control information message comprising the one or more parameters for the sidelink active interference cancellation.

17. The apparatus of claim 15, wherein, to transmit the one or more control messages, the one or more processors are operable to execute the code to cause the apparatus to:
transmit a single downlink control information message comprising the scheduling information for the sidelink transmission and the one or more parameters for the sidelink active interference cancellation.

18. The apparatus of claim 15, wherein the one or more processors are further operable to execute the code to cause the apparatus to:
transmit signaling configuring a plurality of active interference cancellation subcarrier patterns at the one or more UEs, wherein the one or more parameters comprise an active interference cancellation subcarrier pattern of the plurality of active interference cancellation subcarrier patterns.

19. The apparatus of claim 15, wherein the one or more parameters comprise an indication of one or more UEs to perform the sidelink active interference cancellation, a symbol index associated with the sidelink active interference cancellation, or any combination thereof.

20. The apparatus of claim 15, wherein the one or more processors are further operable to execute the code to cause the apparatus to:
transmit the one or more control messages in a group-common channel.

21. An apparatus for wireless communication at a first user equipment (UE), comprising:
one or more memories storing processor-executable code; and one or more processors coupled with the one or more memories and operable to execute the code to cause the apparatus to:
    receive one or more parameters for sidelink active interference cancellation for a sidelink transmission;
    receive, from a second UE, the sidelink transmission based at least in part on modifying interference at a receiver of the first UE according to the one or more parameters; and
    decode the sidelink transmission based at least in part on modifying the interference at the receiver.

22. The apparatus of claim 21, wherein, to receive the one or more parameters, the one or more processors are operable to execute the code to cause the apparatus to:
    receive a first downlink control information message comprising scheduling information for the sidelink transmission; and
    receive a second downlink control information message comprising the one or more parameters for the sidelink active interference cancellation.

23. The apparatus of claim 21, wherein, to receive the one or more parameters, the one or more processors are operable to execute the code to cause the apparatus to:
    receive a single downlink control information message comprising scheduling information for the sidelink transmission and the one or more parameters for the sidelink active interference cancellation.

24. The apparatus of claim 21, wherein the one or more processors are further operable to execute the code to cause the apparatus to:
    receive signaling configuring a plurality of active interference cancellation subcarrier patterns, wherein the one or more parameters comprise an active interference cancellation subcarrier pattern of the plurality of active interference cancellation subcarrier patterns.

25. The apparatus of claim 21, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, an indication of one or more UEs to perform the sidelink active interference cancellation, a symbol index associated with the sidelink active interference cancellation, or any combination thereof.

26. The apparatus of claim 21, wherein the one or more processors are further operable to execute the code to cause the apparatus to:
    receive the one or more parameters before receiving the sidelink transmission from the second UE.

27. The apparatus of claim 21, wherein the one or more processors are further operable to execute the code to cause the apparatus to:
    receive the one or more parameters in sidelink control information.

28. The apparatus of claim 21, wherein the one or more processors are further operable to execute the code to cause the apparatus to:
    receive the one or more parameters for the sidelink active interference cancellation from the second UE, a network entity, or both.

29. A method for wireless communication at a first user equipment (UE), comprising:
    receiving one or more control messages comprising scheduling information for a sidelink transmission to a second UE and one or more parameters for sidelink active interference cancellation for the sidelink transmission, wherein the one or more parameters comprise an active interference cancellation optimization area, a time resource corresponding to a minimized leakage, a frequency resource corresponding to the minimized leakage, a number of active interference cancellation subcarriers, an active interference cancellation subcarrier position, an active interference cancellation subcarrier pattern, or any combination thereof; and
    performing the sidelink transmission to the second UE in accordance with the one or more parameters for the sidelink active interference cancellation.

\* \* \* \* \*